(12) United States Patent
Väre et al.

(10) Patent No.: US 7,567,806 B2
(45) Date of Patent: Jul. 28, 2009

(54) METHOD AND SYSTEM TO IMPROVE HANDOVER BETWEEN MOBILE VIDEO NETWORKS AND CELLS

(75) Inventors: Jani Väre, Kaarina (FI); Jarno Kallio, Turku (FI); Arto Hamara, Turku (FI); Kalle Rindell, Turku (FI)

(73) Assignee: Nokia Corporation, Espoo (FI)

( * ) Notice: Subject to any disclaimer, the term of this patent is extended or adjusted under 35 U.S.C. 154(b) by 609 days.

(21) Appl. No.: 10/935,892

(22) Filed: Sep. 8, 2004

(65) Prior Publication Data

US 2005/0233705 A1 Oct. 20, 2005

Related U.S. Application Data

(60) Provisional application No. 60/548,735, filed on Feb. 27, 2004.

(30) Foreign Application Priority Data

Jun. 9, 2004 (GB) ................................ 0412871.6

(51) Int. Cl.
*H04B 1/00* (2006.01)
*H04B 7/00* (2006.01)
*H04W 36/00* (2006.01)
(52) U.S. Cl. ........................................ 455/436; 455/70
(58) Field of Classification Search ......... 455/436–446, 455/431, 463, 427, 430, 12.1, 13.1, 98, 428, 455/429, 424, 447, 448, 421, 435.2, 452.2, 455/455, 70
See application file for complete search history.

(56) References Cited

U.S. PATENT DOCUMENTS 7,016,426 B1 * 3/2006 Balz et al. ................... 375/261

(Continued)

FOREIGN PATENT DOCUMENTS

GB 2333423 7/1999

(Continued)

OTHER PUBLICATIONS

GB Search Report dated Nov. 8, 2004.

(Continued)

*Primary Examiner*—Melody Mehrpour
(74) *Attorney, Agent, or Firm*—Banner & Witcoff, Ltd.

(57) ABSTRACT

A digital video broadcast network comprises a content provider and several transmitters. Each transmitter may transmit more than one signal, different signals having different frequencies, multiplexes and the like and relating to different network types. An integrated receiver/decoder (IRD) is mobile in the area around the transmitters. As well as transmitting service information as part of a network information table on a data layer, the transmitters provide in their output signals transmitter parameter information as TPS data on a physical layer. This TPS information includes information identifying whether there are other networks available, and preferably the number of other networks. Transmission parameters relating to the other networks are included in an other_network_descriptor, forming part of an NIT actual or a BAT, or alternatively in an NIT_other. This information is used by the IRD in signal scan. Using the described broadcast signals, signal scan can be made more efficient, resulting in reduced power consumption and scanning time. IRDs may also receive free field three dimensional models of signal levels created for a group of cells. The models may be in the form of bitmaps and used during handover procedures.

29 Claims, 11 Drawing Sheets

U.S. PATENT DOCUMENTS

2004/0135929 A1 7/2004 Isao
2006/0234708 A1* 10/2006 Aaltonen .................... 455/436

FOREIGN PATENT DOCUMENTS

| GB | 2390777 | 1/2004 |
| --- | --- | --- |
| GB | 2399986 | 9/2004 |
| GB | 2399986 A | 9/2004 |
| WO | WO 0215582 A1 | 2/2002 |

OTHER PUBLICATIONS

Vare, J et al: Approach for Improving Receiver Performance in Loss-Free Handovers in DVB-H Networks Global Telecommunications Conference, 2004, Globecom '04. IEEE Dallas, TX, USA Nov. 29-Dec. 3, 2004, Piscataway, NJ, USA, IEEE Publ. Nov. 29, 2004 vol. 5, pp. 3326-3331, ISBN 0-7803-8794-5.

Väre, J. et al: Soft Handover in Terrestrial Broadcast Networks. This paper appears in: Mobile Data management, 2004. Proceedings. 2004 IEEE International Conference on. Publication Date: 2004 pp. 236-242. INSPEC AN: 7993062.

* cited by examiner

METHOD AND SYSTEM TO IMPROVE HANDOVER BETWEEN MOBILE VIDEO NETWORKS AND CELLS

The present application claims priority to GB application 0412871.6 filed in Great Britain on Jun. 9, 2004 and to U.S. provisional application Ser. No. 60/548,735 filed on Feb. 27, 2004. The entire disclosures of both applications are hereby incorporated by reference.

FIELD OF THE INVENTION

Aspects of the invention relate to network and cell handover procedures in wireless communications systems. More particularly, aspects of the invention use transmission parameter information for nearby networks and models of cells that map quantized signal levels into pixels within the cell coverage area when making handover decisions.

DESCRIPTION OF THE RELATED ART

Digital broadcasting systems, such as various DVB-T (Terrestrial Digital Video Broadcasting) and DAB (Digital Audio Broadcasting) systems, ATSC, ISDB and other similar broadcasting systems allow for a system comprising transmitters arranged in a cellular fashion, allowing signal reception of a suitable quality over a geographical area through suitable transmitter site selection. The cellular nature of the transmitters' coverage allows mobile receivers to be able to achieve satisfactory performance even when moving. Steps are being taken to incorporate DVB receivers into mobile telephones and Personal Digital Assistants (PDAs), for which applications the DVB standards were not primarily designed. Steps are also being taken to provide services over DVB transmissions. A user may buy services using, for example, the telephone or other bidirectional data transceiver forming part of the mobile telephone or PDA.

A receiver, on decoding the transmission parameter information like the Transmission Parameter Signalling (TPS) data in DVB for a received signal, can use it in certain decision making processes. In particular, a DVB-T receiver in a mobile device can use the cell identification information to eliminate some candidate signals in a handover procedure.

A form of DVB is being tailored for use in mobile receiver environments. This is known as DVB handheld, or DVB-H. In DVB-H, Internet Protocol datacast (IPDC) services are time-sliced, resulting in data for a service being transmitted over a relatively short period of time with relatively high bandwidth. A mobile receiver then needs to receive data only during this short period of time, and its receiver can be switched off at other times. This has positive implications for power consumption in the mobile receiver. Time-slicing is not limited to DVB-H.

In DVB-T or DVB-H, a receiver needs to perform signal scan, in particular on power-up for initialising the receiver with existing networks within the current location. Moreover, the signal scan operation needs to be performed periodically if the receiver moves long distances, and also when the network structure changes. Signal scan can take a considerable amount of time, often up to five minutes depending on the network configuration and the availability of signals and networks.

While traveling within a network, handover decisions for mobile terminals are typically made based on factors such as cell coverage, mobile terminal location and terminal movement information. With a first conventional approach, handover decisions are based on location, cell coverage area and terminal movement vector information. Cell strengths are conventionally modeled by assuming that cells provide the same signal strength within square areas. Such modeling methods are inaccurate and can lead to less than optimal handover decisions.

With a second conventional approach to handover decisions between cells, handover decisions are made based on a location determination that is a function of signal strength, measurement information and cell coverage information. With this approach, a mobile terminal is not aware of its location (e.g. doesn't have GPS) but is able to measure the signal strengths of the surrounding cells. In this case a mobile terminal can roughly detect its position by means of cell area coverage information and signal strength values of surrounding cells. One skilled in the art will appreciate that location information obtained by measuring signal strengths is not precise and can lead to less than optimal handover decisions.

Therefore, there is a need in the art for procedures and systems that utilize parameter information broadcast by a first network and that describe characteristics of other networks to optimize handover between networks. There is also a need in the art for handover procedures and systems that use accurate models of cell station signal strengths to optimize handover procedures between cells.

BRIEF SUMMARY OF THE INVENTION

One or more of the above-mentioned needs in the art are satisfied by the disclosed methods and systems.

According to a first aspect of the invention, there is provided a method of operating a receiver, the method comprising: receiving a signal digitally broadcast from a transmitter of a prevailing network, the signal including transmission parameter information bits; decoding the transmission parameter information from the received signal; and determining from the decoded transmission parameter information whether or not one or more other networks are available.

According to a second aspect of the invention, there is provided a receiver comprising: a receiver arranged for receiving a signal digitally broadcast from a transmitter of a prevailing network, the signal including transmission parameter information bits; a decoder for decoding the transmission parameter information from the signal; and a determiner for determining from the decoded transmission parameter information whether or not other networks are available.

These aspects of the invention can allow improved receiver operation, in particular by allowing the receiver to determine from the transmission parameter information bits broadcast in respect of one network whether or not there are or could be other networks. This may be particularly important when performing signal scan, for initializing a receiver with parameters needed for service discovery. Should the receiver be controlled to accept this information as valid, it can allow a significantly simplified network signal search. This may be particularly important in a mobile receiver, since signal search can be time consuming, introducing the possibility of error in a moving receiver environment, and also involve undesirable power consumption. The invention can allow these disadvantages to be ameliorated. In systems such as the DVB system, this is particularly advantageous since the service information, in a worst case scenario, may be transmitted only once in a ten second interval, whereas the transmission parameter information may be available very quickly after achieving lock to the tuned signal. The TPS is defined over 68 consecutive OFDM symbols, referred to as one OFDM frame. Four consecutive frames correspond to one OFDM super-frame. The reference sequence corresponding to the TPS carriers of the first symbol of each OFDM frame are used to initialize the TPS modulation on each TPS carrier. Each OFDM symbol conveys one TPS bit. Each TPS block (corresponding to one OFDM frame) contains 68 bits. The inter-bit interval of TPS bits depends on the symbol speed of the signal. Typically all the TPS bits are received within 100 ms or less.

In DVB-T and DVB-H, transmission parameter information is transmitted on a lower level than service information. In the embodiments, service information is transmitted on a data level (OSI level 2) whereas TPS information is transmitted on a physical level (OSI level 1). The term 'level' will be understood to mean a layer in a protocol stack, such as but not limited to the OSI seven layer model.

According to a third aspect of the invention there is provided a method of operating a receiver, the method comprising: receiving a signal digitally broadcast from a transmitter of a prevailing network, the signal including other network descriptor information; decoding the other network descriptor information from the signal, obtaining from the other network descriptor information transmission parameters relating to one or more other networks, and using the transmission parameters to tune the receiver to the one or more other networks.

According to a fourth aspect of the invention there is provided a receiver comprising: a receiver arranged for receiving a signal digitally broadcast from a transmitter of a prevailing network, the signal including other network descriptor information; a decoder for decoding the other network descriptor information from the signal, means for obtaining from the decoded other network descriptor information transmission parameters relating to one or more other networks, and a tuner controller arranged for using the transmission parameters to tune the receiver to the one or more other networks.

These aspects of the invention can allow improved receiver operation, in particular by allowing the receiver to determine from the other network descriptor information broadcast in respect of one network transmission parameters relating to one or more other networks. This may be significant since, should the receiver be controlled to accept this information as valid, it can allow a significantly simplified network signal search. This is particularly important in a mobile receiver, since signal search can be time consuming, introducing the possibility of error in a moving receiver environment, and also involve undesirable power consumption. The invention can allow these disadvantages to be ameliorated.

According to a fifth aspect of the invention there are provided systems that use free field three dimensional models of signal levels created for a group of cells. The models may be in the form of bitmaps. A mobile terminal can determine the inner area within the cell where it is located, based on the measured signal strength and maximum signal strength value (depending on the antenna sensitivity of the receiver and calibrated 'free-field' signal strength) indicated in the bitmap information. This information may be used to execute handover procedures. In various implementations, a mobile terminal can determine the inner area within the cell where it is located, based on the measured signal strength and maximum signal strength value (depending on the antenna sensitivity of the receiver and calibrated 'free-field' signal strength) indicated in the bitmap information. In one particular implementation, a mobile terminal is provided and configured to use bitmap information to improve handover procedures.

In other aspects of the invention, computer-executable instructions for implementing the disclosed methods are stored on computer-readable media.

One skilled in the art will appreciate that one or more of the aspects of the invention described above may be combined. For example, various aspects of the invention may utilize one or more of the disclosed network handover procedures in combination with one or more of the disclosed cell handover procedures.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

I. Handover Between Networks

Figure 1:
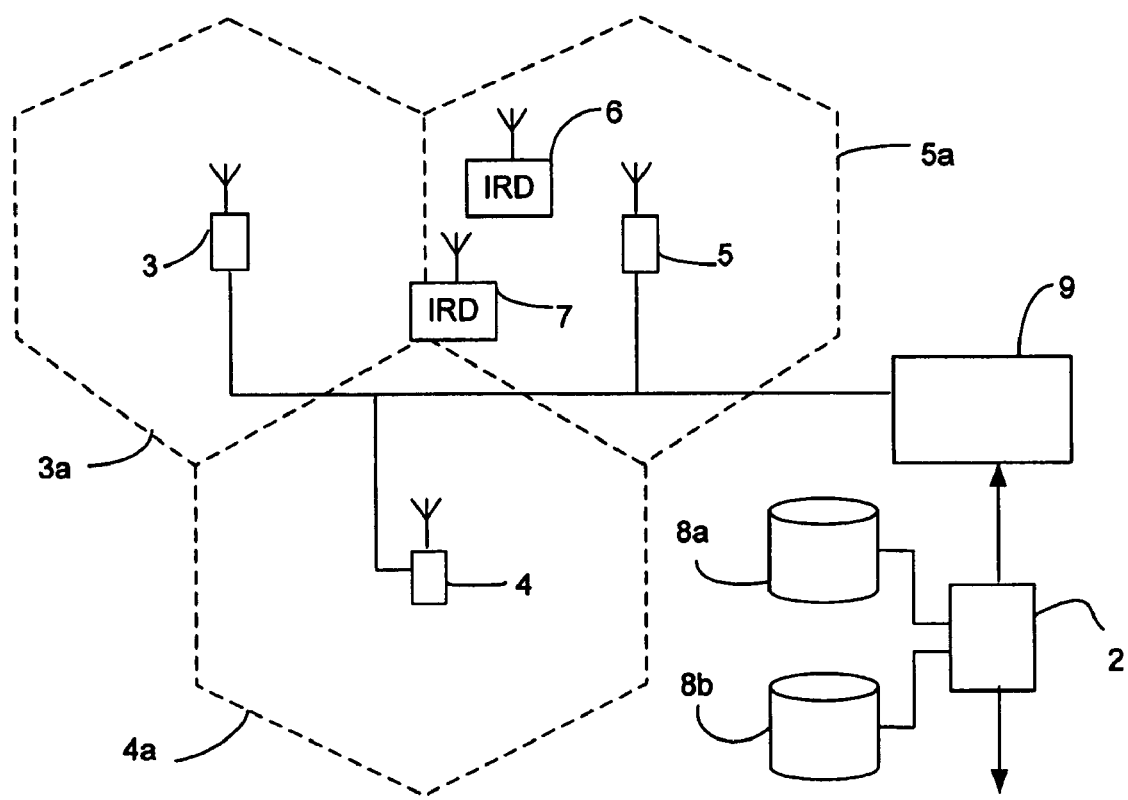
FIG. 1 is a schematic drawing of a digital video broadcast system, including components operating according to an embodiment of the invention.

The standards document EN 300 744 V1.5.1 published by the European Telecommunications Standards Institute (ETSI) specifies TPS carriers, which are used for signalling parameters related to the transmission scheme used. The TPS carriers are constituted at a physical layer, or OSI layer 1, of the communication protocol stack. The decoding of the TPS in a receiver allows the channel coding and modulation used in the transmission to be determined, which information is used in controlling the receiver to operate accordingly. The TPS data is defined over 68 consecutive OFDM (Orthogonal Frequency Division Multiplex) symbols, referred to as one OFDM Frame. The TPS data is transmitted in parallel on seventeen TPS carriers for the DVB 2K mode, on 34 carriers for the 4K mode, and on 68 carriers for the 8K mode. Every TPS carrier in the same symbol conveys the same differentially encoded information bit. The TPS is transmitted as shown in Table 1.

TABLE 1

| Bit Numbers | Purpose/content |
| --- | --- |
| $S_0$ | Initiation |
| $S_1$-$S_{16}$ | Synchronisation Word |
| $S_{17}$-$S_{22}$ | TPS length indicator |
| $S_{23}$-$S_{24}$ | Frame Number (in a Super-Frame) |
| $S_{25}$, $S_{26}$ | Constellation (QPSK or 16 or 64 QAM) |
| $S_{27}$, $S_{28}$, $S_{29}$ | Hierarchy Information |
| $S_{30}$, $S_{31}$, $S_{32}$ | Code rate, HP stream |
| $S_{33}$, $S_{34}$, $S_{35}$ | Code rate, LP stream |
| $S_{36}$, $S_{37}$ | Guard Interval |
| $S_{38}$, $S_{39}$ | Transmission Mode (2K, 4K or 8K) |
| $S_{40}$-$S_{47}$ | Cell identifier |
| $S_{48}$, $S_{49}$ | DVB-H signalling |
| $S_{50}$-$S_{53}$ | Reserved for future use |
| $S_{54}$-$S_{67}$ | Error protection (BCH code) |

It should be noted that the synchronisation word takes one value for odd numbered frames and the inverse for even numbered frames in a Super-Frame. Also, the cell identifier is two bytes long, and is divided between successive Frames.

More important to some decision-making processes is the information received as service information (SI), which is described in detail in DVB standards document ETS 300 468. The standard document ISO/IEC 13818-1 specifies Program Specific Information (PSI). The PSI/SI data provides information for enabling automatic configuration of a receiver to demultiplex and decode the various streams of programs within the multiplex signal. The PSI/SI data includes a Network Information Table (NIT), which provides information relating to the physical organisation of the multiplexes, also known as Transport Streams (TS), carried via a given network. A receiver can store the NIT contents, to minimise access time when switching between channels. The PSI/SI data forms part of the data layer, or OSI layer 2, of the communication protocol stack.

A receiver, also known as an Integrated Receiver/Decoder (IRD) detects parameters of a prevailing signal and/or network by filtering and parsing a received PSI/SI table. From this information, an IRD can determine whether or not a signal is a valid handover candidate. However, since typically PSI/SI tables may be transmitted in any interval from 25 milliseconds to 10 seconds, depending on the table (e.g. maximum interval for NIT table is 10 seconds), and since the PSI/SI information is transmitted on a data layer (i.e. OSI level 2), signal scanning and handover processes can be expected to involve utilisation of a significant amount of the processing, receiver and power resources of the IRD, as well as being time consuming. This is of particular importance as regards power consumption in battery-operated mobile handheld devices.

Referring firstly to FIG. 1, an example of a Terrestrial digital video broadcasting (DVB-T/H) system is shown generally at 1. The system comprises a content provider 2, which is connected by suitable links to each of first, second and third transmitter stations 3, 4, 5. The transmitter stations 3-5 are separated from each other at locations selected such as to provide suitable coverage of the surrounding geography. In FIG. 1, the transmitters 3-5 are shown having respective coverage areas 3a, 4a and 5a, although it will be appreciated that in practice the area covered by a given transmitter will not be so regular and that there will be significant amount of overlap between the coverage areas 3a-5a. Also shown in FIG. 1 are first and second integrated receiver/decoders (IRD) 6, 7. The content provider 2 has access to sources of content 8a, 8b, such as audio-visual content, data files or images. The content is transmitted using IP over DVB-T network, in what is known as an IP Datacasting (IPDC) service, and preferably using time-slicing, to one or more of the IRDs 6, 7, which are configured to receive data from one or more different communication channels. The IRDs 6, 7 in this embodiment are mobile devices that may be incorporated in mobile telephones or personal digital assistants (PDA), for example.

The content data is transmitted to a network element 9, which in this example is a server configured to receive the content data and to generate recovery data for use in forward error correction of the content data. The content data is transmitted to the IRDs 6, 7 via the transmitters 3-5. The recovery data is transmitted to the IRDs in one embodiment of the invention via a second communication channel provided for example by a Third Generation (3G) mobile network (not shown). It should be noted that the communication paths for the content and recovery data are described with reference to and shown in FIG. 1 in a simplified form. However, other elements such as further transmitters, network elements or networks may be situated in these communication paths Each IRD 6, 7 is able to receive and decode signals transmitted by any or all of the transmitters 3-5.

Figure 2:
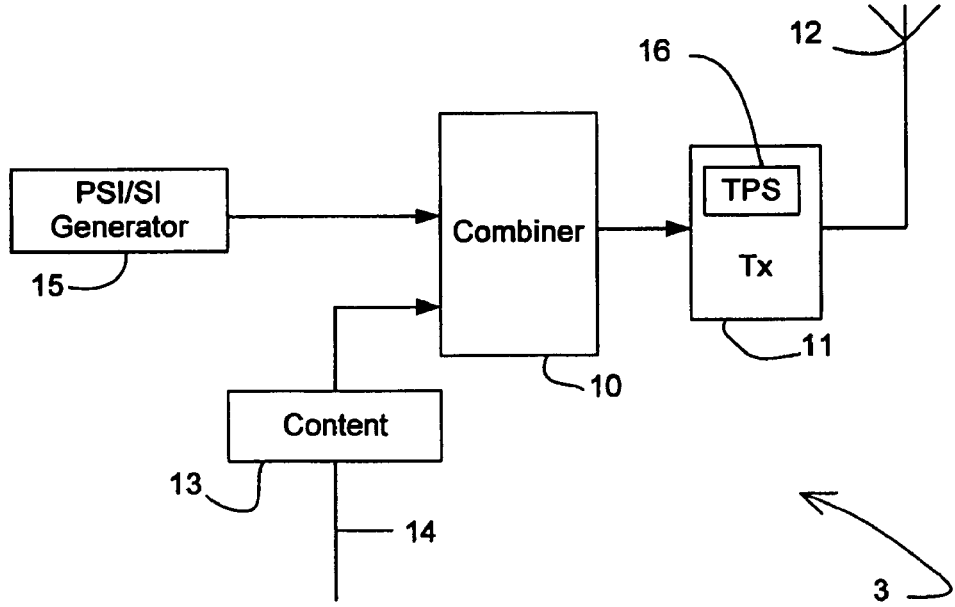
FIG. 2 is a schematic drawing of one of the transmitter stations of the system of FIG. 1.

Each of the transmitters 3-5 is substantially the same, and one is illustrated in FIG. 2. Referring to FIG. 2, a transmitter station 3 is shown in schematic form, comprising generally a data source in the form of a combiner 10, a transmitter 11 and an antenna 12. The combiner 10 receives input data from a content provider 13, which is connected via an input 14 to the content provider 2 shown in FIG. 1. Also arranged to provide data to the combiner is a Program Specific Information (PSI) (or Service Information (SI)) data generator 15. The transmitter 11 includes a transmission parameter signalling (TPS) data generating device 16. The combiner 10 is arranged to source data from the content provider device 13 and the PSI/SI generator device 15 and to provide a data stream according to the DVB standards for inclusion with TPS data and subsequent transmission by the transmitter 11. According to the EN 300 744 standard, data provided by the TPS generator 16 is included in the physical layer of the transmitted signals many times a second, whereas the PSI/SI generating device 15 data is included in the data layer of the transmitted signal and much less frequently, with up to 10 second intervals between data transmissions. As is conventional the PSI/SI generator 15 generates data representing a network information table (NIT), which is in accordance with the DVB standards. The transmitter 11 can therefore be considered to include transmission parameter information provided by the TPS generator 16 with service information provided as part of the data generated by the PSI/SI generator 15. The resultant signal can be considered as a composite signal, and it is the composite signal which is then transmitted by the transmitter 11 by way of the antenna 12. Of course, the composite signal also includes content data provided by the content generator 13, and other data which is outside the scope of this disclosure.

Each of the transmitters 3-5 may transmit plural signals according to the DVB standards. In this connection, the transmitters 3-5 may include plural physical transmitters at a single location and sharing a common antenna. Each signal transmitted by a given one of the transmitters 3-5 may differ from other signals in terms of the frequency of the signal, the network type, the format of the transport stream, the network's topology, the transmitter power, and the nature of the multiplexing used. For example, multiplexing may be in a time-sliced nature, which is conceptually similar to time division multiplexing, or it may be that multiplexing is effected other than in the time domain. The types of transport stream which might be used will be known by those skilled in the art. The network type might be, for example, a DVB-T/H network or an Internet Protocol Data Cast (IPDC) network. The topology of the network might be single frequency or multiple frequency. A multiple frequency network might have transmissions on plural contiguous frequency bands. The present DVB standards allow for bandwidths of 5, 6, 7 and 8 MHz. The implementation of DVB-T in Europe is presently utilising signals having a bandwidth of 8 MHz.

The TPS data transmitted by the transmitter 11 via the antenna 12 differs from conventional TPS data by the inclusion of additional information therein.

Figure 3:
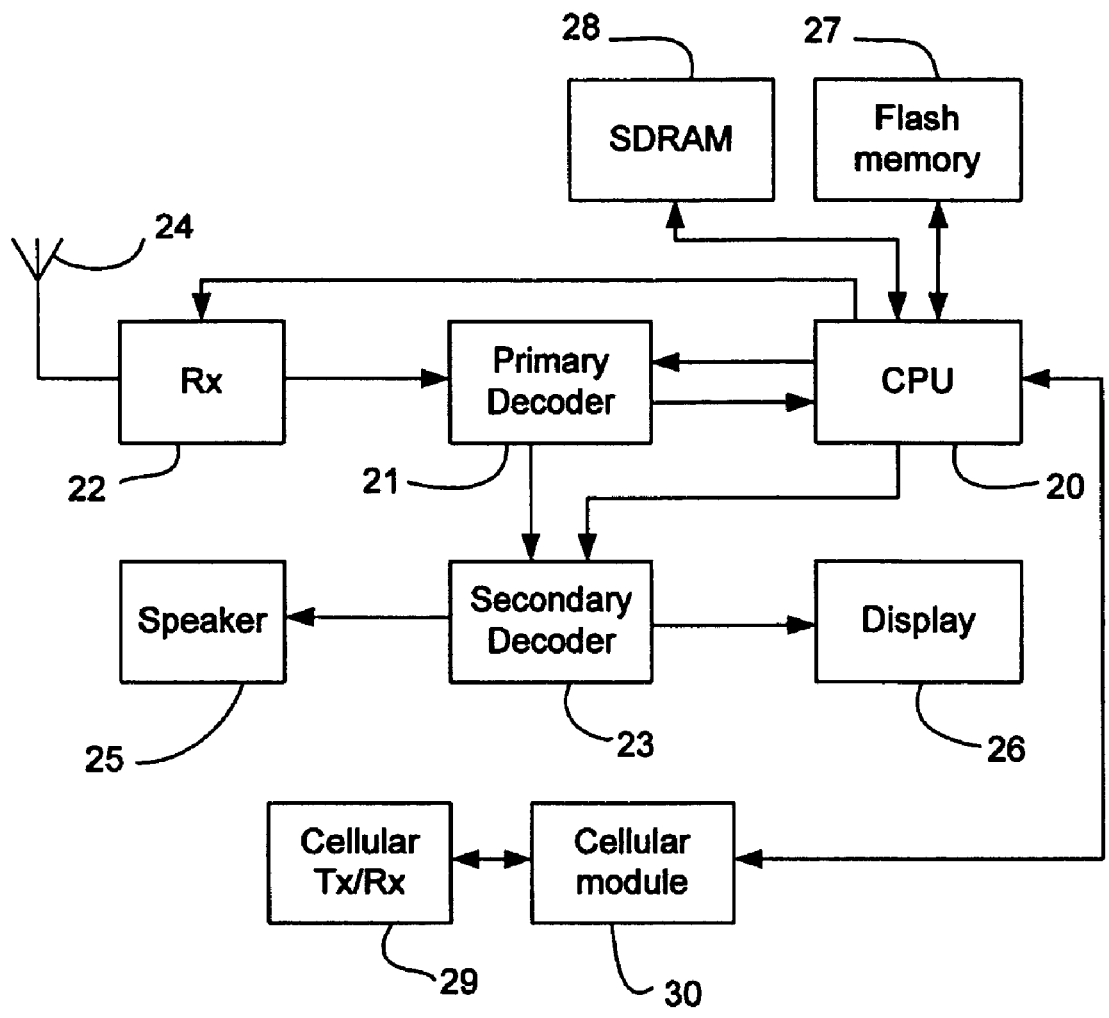
FIG. 3 is a schematic drawing of an integrated receiver/decoder of the system of FIG. 1.

The IRD 6, 7 will now be described with reference to FIG. 3. Referring to FIG. 3, the IRD 6, is shown very schematically, comprising generally a central processing unit (CPU) 20, which is connected to control each of a primary decoder 21, a receiver 22, a secondary decoder, e.g. an MPEG-2 and IP (Internet Protocol) decoder 23, to storage means such as a non-volatile flash memory 27, and to a volatile SDRAM memory 28.

The receiver 22 is connected to receive radio frequency signals via an antenna 24, and to provide demodulated signals to the decoder 21. The primary decoder 21 is arranged under control of the CPU 20 to provide decoded data both to the CPU and to provide MPEG or IP data to the secondary decoder 23. The secondary decoder 23 provides audio outputs to a speaker 25 and visual outputs to a display 26, whereby audiovisual content present in the signal received at the receiver 22 can be presented to a user. Although in this example IP and MPEG signals are able to be processed by a common decoder 23, it will be appreciated that separate decoders could be used instead.

The flash memory 27 may be used to store data parsed from an NIT during signal scan. The SDRAM 28 may be used to store some of the data used in earlier stages of a handover procedure.

Although not essential, the IRD 6 also may include a transceiver 29 for allowing communication in a mobile telephone system, such as e.g. GSM, GPRS, 3G, UMTS for example, which is coupled to a corresponding mobile telephone and data handling module 30. The transceiver 29 and the module 30 allow the IRD 6 to operate as a telephone and mobile Internet portal, as well as to allow the user of the IRD to subscribe to services of interest which are communicated by data cast using the DVB network. This can be achieved in any convenient manner. For example, the user might send a request for service delivery to a mobile telephone operator with which the user subscribes using the UMTS components 29, 30. The operator may then arrange for the service to be provided via DVB using an Internet service provider. Notifications of service delivery may be communicated to the IRD using the UMTS system or the DVB system.

The IRD 6 differs from conventional IRDs in that it is arranged to detect information relating to other network and forming part of TPS data, and to utilise that data appropriately. Operation of the IRD 6 in a signal scan procedure will now be described with reference to FIG. 4. It will be understood that the signal scan procedure is performed for initialising the receiver 6 with parameters needed for OSI layers 1 and 2 service discovery and for subsequently updating these parameters.

The first embodiment, which will now be described with reference to FIGS. 1 to 4, can allow more rapid discovery of other signals, using TPS bits and a descriptor called 'other_network_descriptor'. More rapid discovery typically decreases power consumption during signal scanning (i.e. initialization). The described 'other_network_descriptor' can also be used by a receiver to determine when it should update its database, by performing signal scan.

Briefly, the TPS bits include an indication of whether other networks are available or not, and information concerning the available signals of other networks is signaled using the other_network_descriptor. This descriptor can be included for example in the NIT, or alternatively in the BAT (Bouquet Association Table). A receiver is able to detect the availability of other networks from the TPS bits transmitted in respect of one signal or network. The receiver can also determine information concerning these other networks using information included in the other_network_descriptor. An NIT is segmented into sections describing the _actual network and _ other networks. There are two table ids used for NIT sections, 0x40 for sections describing the _actual network and 0x41 for sections describing _other networks.

Each network comprises one or more transmitters. Each transmitter transmits one or more signals. Information is shared between networks. The networks together comprise a system of networks. A DVB network is identified by a globally unique 'network_id'. A DVB network consists of one or more Transport Streams (TSs), each carrying a multiplex and being transmitted through one or more DVB signals. Information about a DVB network is available within an NIT sub_table, which is identified by the network_id. The NIT lists all multiplexes and DVB signals available within the DVB network. The NIT is carried within each TS of the DVB network.

A multiplex is a set of one or more DVB services multiplexed together, and carried on a TS. A TS carries one and only one multiplex. A multiplex and the TS carrying it are identified by transport_stream_id and original_network_id. Transport_stream_id is unique within original_network_id. Original_network_id is the network_id of the DVB network generating the multiplex.

If one multiplex is transmitted on two different DVB signals within a DVB network, the DVB signals carry the same TS. However, if the DVB signals belong to different DVB networks, the TS is different. In both cases, the set of DVB services, PSI information and multiplex identifiers (transport_stream_id and original_network_id) are identical. However, if the DVB signals belong to different DVB networks, SI information (particularly the information about the actual DVB network, i.e. content of sections for the actual network, NIT_actual) is different. In such a case, there is only one multiplex, although it is carried on two different TSs.

Therefore, a multiplex can be considered as a set of DVB services, while a TS can be considered as a bitstream carrying a multiplex and related PSI/SI information. A multiplex may be delivered on multiple DVB networks, while a TS belongs to only one DVB network. The network_id of the DVB network transmitting the TS is announced in the NIT_actual carried within the TS.

Within a DVB network, a TS may be carried on multiple DVB signals. A DVB signal using non-hierarchical modulation carries one TS, while a DVB signal using hierarchical modulation carries two TSs.

It is technically possible for two networks to share the same physical transmitter, although this is unlikely. However, the transmitters of two networks can be at the same physical location, i.e. have the same cell centre. Two or more transmitters of the same network may be at the same location, thus providing completely overlapping coverage resulting in a single cell. Different transmitters can have the same or different cell sizes. Two or more transmitters of a network can form adjacent cells if the transmitters are not at the same location. Signals are transmitted as part of the same network if they share same network_id, which is identified and announced in NIT.

What constitutes an available network is a matter for the network operator. At one extreme, an available network can be one which is transmitted by a transmitter at the same physical location as the transmitter of the prevailing network and which has the same cell size. However, an available network can instead be available or exist within some specified or unspecified distance from the signal of the prevailing network. Thus, an available network may relate to an adjacent or remote cell. Whether the network actually is available or not depends on the receiver, and in particular its ability to receive a signal from a transmitter of the other network. This depends on the receiver and on geographical factors as well as transmission power and the distance between the transmitter and the receiver.

In this example, a network will be considered by the system as an 'available network' if it is broadcasting signals which may be available to the receiver. This allows a receiver to identify what networks it may be able to receive from one network's signal, although it does not necessarily mean that the receiver will be able to receive all the other networks for the entire coverage area of the one network.

In this first embodiment, the TPS data generated by the TPS generator 16 includes one TPS bit which signals the availability of other DVB-H networks. Signalling is as shown in Table 2.

TABLE 2

| Bit n | Availability of other DVB-H network |
|---|---|
| 0 | Other DVB-H networks are available |
| 1 | No other DVB-H networks are available |

The bit n can be any on of the TPS bits which currently are reserved for future use. However, this information can be transmitted instead using two or more bits, with additional information content if required.

The syntax for the other_network_descriptor, located for example in the NIT or the BAT of the signal, is as shown in Table 3.

TABLE 3

| Syntax | No. of bits | Identifier |
|---|---|---|
| descriptor_tag | 8 | uimsbf |
| descriptor_length | 8 | uimsbf |
| for (I=0; I<N; I++){ | | |
| network_type | 8 | uimsbf |
| network_id | 16 | uimsbf |
| for (i=0; i<N; i++) { | | |
| ISO_639_language_code | 24 | uimsbf |
| network_name_length | 8 | uimsbf |
| for (j=0; j<N; j++){ | | |
| char | 8 | uimsbf |

TABLE 3-continued

| Syntax | No. of bits | Identifier |
|---|---|---|
| } | 16 | uimsbf |
| } | | |
| reserved for future use | 4 | uimsbf |
| signal_loop_length | 12 | uimsbf |
| for (i=0; i<N; i++) { | | |
| transport_stream_id | 16 | uimsbf |
| original_network_id | 16 | uimsbf |
| frequency | 32 | uimsbf |
| cell_id | 16 | uimsbf |
| } | | |
| } | | |

This table loops once for each other network.

Semantics for the fields of the other_network_descriptor are as follows.

An 8-bit field 'network_type' identifies the type of the network that the descriptor relates to. This may indicate for example a DVB-H network.

A 16-bit field 'network_id' identifies the terrestrial network that supports the service indicated. This may identify for example a BBC network.

'ISO_639_language_code' is a 24-bit field which contains the ISO 639-2 three character language code of the language of the network. In DVB, either ISO 639-2/B or ISO 639-2/T may be used. Each character is coded into 8 bits according to ISO/IEC 8859-1 and inserted in order into the field. For example, the French language has the 3-character code "fre", which is coded as "0110 0110 0111 0010 0110 0101".

An 8-bit field 'network_name_length' specifies the length in bytes of the network name, which is included in the following field. The 'network_name_length' field allows a receiver to delimit the network name bits from the other bits. The length is given as j bytes in Table 3.

The 'network_name' field has a length determined by the 'network_name_length' field. Each byte of the 'network_name' field constitutes a character. This is indicated by 'char' (i.e. character) in Table 3. In Table 3, there are j characters. Text information is coded using the character sets and methods described in Annex A of standard EN 300 468. The field allows a receiver to determine the name of the network, for example Digita.

'ISO_639_language_code', 'network_name_length' and 'network_name' fields are repeated for each available network.

Four bits of the other_network_descriptor are reserved for future use.

'signal_looplength' is a 12-bit field which specifies the total length in bytes of the signal identifying parameters that follow the field.

'transport_stream_id' is a 16-bit field which serves as a label for identification of the transport stream (TS) from the equivalent network. 'original_network_id' is a 16-bit field that gives the label identifying the network identification of the originating delivery system. The delivery system is the system where the TS was generated.

'frequency' is a 32 bit field which identifies the frequency at which the network signal is broadcast.

Finally, 'cell_id' is a 16-bit field which uniquely identifies the cell carrying the network signal.

These latter four fields are repeated for each available network.

Other information or parameters may be included in the descriptor.

The parameters and other information signalled in the other_network_descriptor may be used by a receiver in the manner shown in FIG. 4 as follows.

Figure 4:
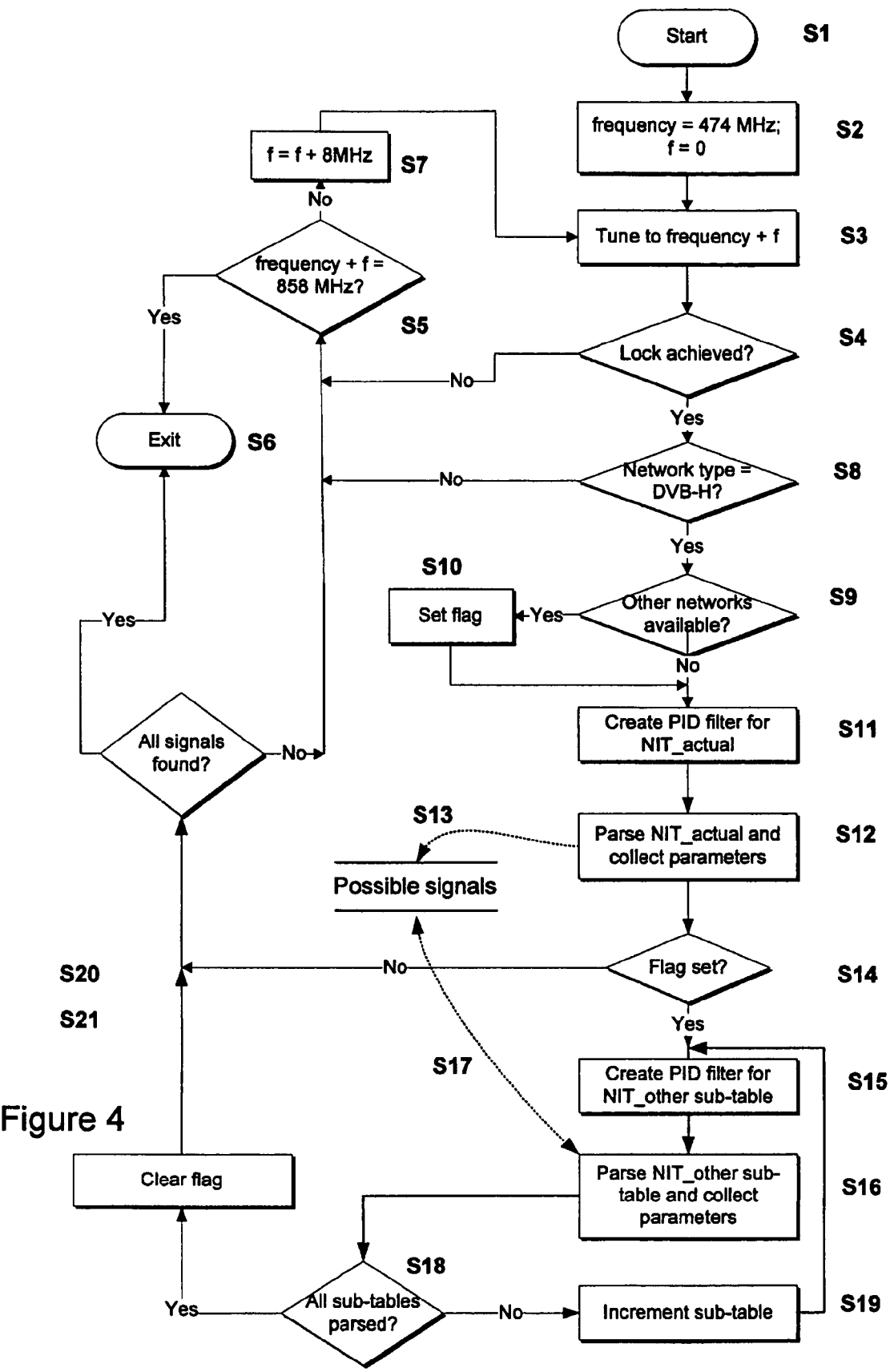
FIG. 4 is a flowchart illustrating operation of the integrated receiver/decoder of FIG. 3 in a signal scan procedure when broadcast data is according to a first embodiment of the invention.

Referring to FIG. 4, the procedure is started at step S1. At step S2 a variable "frequency" is set to the lowest frequency of the frequency band, which in this example is 474 MHz, and a variable "f" is set to a value of 0. At step S3 the receiver 22 is tuned to a frequency equal to "frequency" plus "f". At step S4, it is determined by the CPU 20 whether or not tuning lock is achieved. The absence of a tuning lock is used to infer that no signal of sufficient strength is being transmitted at that frequency. Accordingly, a negative determination to step S4 leads to step S5 where it is determined if the sum of the variables "frequency" and "f" is equal to 858 MHz, which is the highest frequency of the frequency band in this example. If a positive determination is made, it is inferred that the entire frequency band has been searched and the procedure proceeds to exit at step S6. Otherwise, the procedure advances to step S7, where the variable "f" is increased by 8 MHz and the procedure returns again to step S3. 8 MHz is the bandwidth used in Finland and other European countries, although DVB also allows bandwidths of 6 or 7 MHz and a bandwidth of 5 MHz has also been proposed. The bandwidth may be derived from the terrestrial_delivery_system_descriptor field of a first-decoded NIT, or may be otherwise known by the IRD 6.

When at step S4 tuning lock is achieved, the operation proceeds to step S8, where the TPS data is examined by the CPU 20. If the examination of the TPS data reveals that the network is a DVB-H network, the procedure advances to step S9. Otherwise, it is inferred that the signal does not emanate from a suitable network type (i.e. is not a DVB-H network signal) and the procedure retreats to step S5. Whether the network is a DVB-H network can be determined instead from the NIT for the signal, and in particular from the terrestrial_delivery system_descriptor field thereof. At step S9, the CPU 20 determines from the decoded TPS data, and in particular the bit thereof shown in Table 2, whether or not there are other available networks. If the relevant TPS bit is '1', revealing that there are other available networks, an appropriate flag is set at step S10. The number of available network signals can be determined in this example by counting the number of networks identified in the other_network_descriptor. The number of signals can be instead be communicated through data included in the TPS bits, as in the second embodiment described below, or in any other suitable way. However, the number of other available networks does not necessarily need to be determined, but the receiver may choose to scan the whole band as the information on the number of networks is not necessarily complete. After step S10, or if the TPS data indicates no other available networks, the procedure advances to step S11.

At step S11, the PSI/SI data for the prevailing network signal is decoded, if not already decoded, and the NIT_actual is examined. This examination involves the creation of a PID (Packet IDentifier) filter (PID=0x0010) for the TS packets carrying NIT information. From the network_information_sections of these packets, sections having table_id 0x040 (network_information_section—actual network) are filtered for processing, and from these sections the network_id is stored to memory. Tuning parameters for each DVB-H signal are derived from the terrestrial_delivery descriptor. The cell_id is derived from the cell_frequency_ink_descriptor. Also, linkage information for INT table (PMT_service_id for INT) is derived for each signal from the linkage_descriptor. Finally, time_slicing_indicator for each transport_stream is derived from terrestrial_delivery_system descriptor. The data relating to broadcast frequency are found in the cell_frequency_link, terrestrial delivery_system, and frequency_list descriptors of the NIT_actual. At step S12, the NIT_actual is parsed by the CPU 20 and the parameters needed for OSI layers 1 and 2 service discovery are collected therefrom. If the flag has been set at step S10 to indicate the availability of other networks, the other_network_descriptor is parsed, if not already parsed, and parameter information concerning the other networks is collected. The relevant data is stored in an area of temporary memory, indicated at "possible signals", at step S13.

The procedure then moves onto step S14, where it is determined whether the flag is set. If it is, the procedure moves onto step S15, where a PID filter is created for TS packets carrying information in the NIT relating to other networks. The sections relating to other networks have table_id of 0x41. Such sections have the same network_id as an NIT_other sub_table. The NIT_other sub-tables are then parsed at step S16, and parameters needed for OSI layers 1 and 2 service discovery are collected from it. The relevant data is stored in the area of temporary memory indicated at "possible signals" and used by step S13, at step S17. These are termed 'possible signals' since they are not necessarily known to be receivable by the receiver 6.

At step S18 it is determined whether all the sub-tables have been parsed for parameters. If not, then the procedure increments the sub-table at step S19 before proceeding again to step S15. Step S18 can be carried out in any suitable manner, for example through suitable examination of the section_number and last_section_number fields, or using a timeout, of 10 seconds for example.

Step S15 may implement its function by filtering only by table_id, with network_id and version number being masked. A next, or unparsed, sub-table is identified through the table_id. At step S16, the network_id and version number for the parsed sub-table is checked. The next time step S15 is carried out for that NIT_other table, the already-parsed sub-tables are masked, to filter them out.

If step S14 determines that the flag is not set, the procedure advances to step S20, where it is determined if all the existing signals, as identified in other_network_descriptor, have been found. If so, signal scan is terminated at step S6. Otherwise, signal scan is continued at step S5.

When step S18 determines that all the sub-tables for the other networks have been parsed, the flag is cleared at step S21 before the procedure advances to step S20.

As will be appreciated, the procedure illustrated in FIG. 4 can allow for the identification of parameters relating to other networks, thus allowing those networks to be tuned to, without the receiving and decoding of the NIT from the PSI/SI data for the other networks. Also, if there are no other networks, this is known from examination of the TPS bits of the one network signal, avoiding the need to scan the other possible frequencies at which signals may be found. This can allow the creation of a list of possible signals utilising fewer resources and in a shorter period of time than can be achieved using the conventional signal scan procedure.

Since the other_network_descriptor is included in the NIT_actual, information about other networks can be gleaned earlier than in the prior art. Thus, with the first embodiment, information from other networks can be parsed by a receiver substantially simultaneously with the information from the current network, at step S12 in the Figure. Accordingly, power consumption is decreased considerably, and the user experience thereby is improved. Also, the inventors consider that the inclusion of the other_network_descriptor in the NIT_actual may allow descriptors previously present elsewhere to be omitted altogether, allowing the size of the NIT to be reduced. This could have the effect of reducing the amount of time that an IRD needs to be switched on for, resulting in reduced power consumption.

In the example shown in FIG. 4, an entire signal scan is performed, since this can allow networks to be found even if their presence is not notified by other networks. However, if other network signalling is treated as trustworthy, then this can be avoided.

If an entire signal scan is not required, it may still be desirable to tune to the signals of the networks identified by the NIT_other table. This can be the case when for example the NIT_other sub-tables do not contain all the information that the receiver requires.

A second embodiment will now be described, with reference to FIGS. 1 to 3 and 5. Briefly, this embodiment can provide more rapid discovery of other networks, and utilises NIT_other tables, i.e. collections of sections describing the other networks, to carry transmission parameters relating to other networks. NIT_other tables are known in the prior art, but this embodiment provides as additional contribution to the art. The availability of other networks is signalled within TPS bits, and the number of available other networks also is signalled within the TPS bits. The bits used for this signalling are some which currently in the standard are reserved for future use. A receiver is able to detect the availability and number of other networks via TPS bits. If transmission of NIT_other is supported by the network, which it is in the embodiment, the receiver can collect transmission parameters relating to other networks from one or more NIT_other tables included in a first network signal, i.e. without decoding data from those other networks. Also, when analysis of data from one network reveals that no other networks exist, the receiver can terminate signal scan, since further scanning would be superfluous. Power consumption thus can be decreased considerably, and user experience thus can be improved. The second embodiment can decrease power consumption during signal scanning on initialisation, although it can also be used to advantage on any signal scan, including one performed for the purpose of enabling handover.

A receiver is unable to detect the availability of other networks except by creating a filter and waiting to see if sections having table_id of 0x41 (i.e. relating to NIT_other) are found. These sections form sub-tables, each sub-table including information relating to a different network. Each sub-table has the same table_id, network_id and version number.

There are two table ids used for NIT sections, 0x40 for sections describing the actual network and 0x41 for sections describing other networks.

The structure and semantics of an NIT section describing other network is similar to an NIT section describing the actual network. The main difference between these is that, whereas NIT_actual (sections describing the actual network) describes the network that the current (prevailing) signal is part of, NIT_other (sections describing other networks) describes other existing networks which the current signal is not part of.

In the second embodiment, the TPS data generated by the TPS generator 16 includes bits as shown in Table 4.

TABLE 4

| Bits l, m, n | No. of other available DVB-H networks |
|---|---|
| 000 | One |
| 001 | Two |
| 010 | Three |

TABLE 4-continued

| Bits l, m, n | No. of other available DVB-H networks |
|---|---|
| 011 | Four |
| 100 | Five |
| 101 | Six |
| 110 | Seven |
| 111 | Zero |

Thus, bits l, m and n of the TPS data describe exactly a number of available other networks between zero and seven. The number of bits used could be increased or decreased if the maximum possible number of available networks requires or allows this, but the inventors consider that three TPS bits is particularly suitable for use in identifying the number of DVB-H networks in most circumstances.

Alternatively, the three bits TPS bits l, m, n may instead represent the number of up to seven other networks with '000' indicating that there are no other networks available, and '111' indicating that seven other networks are available.

Furthermore, instead of identifying precisely how many other networks are available, the TPS bits may instead together uniquely identify a range into which the number of networks falls. For example, '00' may indicate 0 or 1 other networks, '01' indicates 2-4 other networks, '10' indicates 5-8 other networks, and so on. However, this has the disadvantage that a receiver would not be able to determine from the TPS bits the exact number of available other networks. When the exact number of other available networks is signalled, it can be used as counter start or end value.

Each network transmits information relating to the physical organisation of the multiplexes/TSs carried via the network in an NIT table describing the contents of the actual delivery system, and may also carry information describing the contents of the other delivery systems as is known from the DVB standard ETSI EN 300 468.

For initializing the receiver 6, the following parameters may be significant:

A 16-bit field 'network_id' identifies the terrestrial network that supports the service indicated. This may identify for example a Digita network.

The 'network_name' field has a length determined by the 'network_name_length' field. Each byte of the 'network_name' field constitutes a character. This is indicated by 'char' (i.e. character) in Table 3. In Table 3, there are j characters. Text information is coded using the character sets and methods described in Annex A of standard EN 300 468. The field allows a receiver to determine the name of the network, for example BBC.

'transport_stream_id' is a 16-bit field which serves as a label for identification of the transport stream (TS) from the equivalent network.

'original_network_id' is a 16-bit field that gives the label identifying the network identification of the originating delivery system.

Finally, 'cell_id' is a 16-bit field which uniquely identifies the cell carrying the network signal.

By suitable control of the transmitter stations 3-5, each network includes an NIT table which relates information about itself (i.e. NIT_actual) and about all of the other available networks (i.e. NIT_other). NIT other and NIT actual have similar structures, but do not necessarily have mutually similar transmission parameter information.

Signalled parameters as described can be utilised in the receiver 6 as follows.

Figure 5:
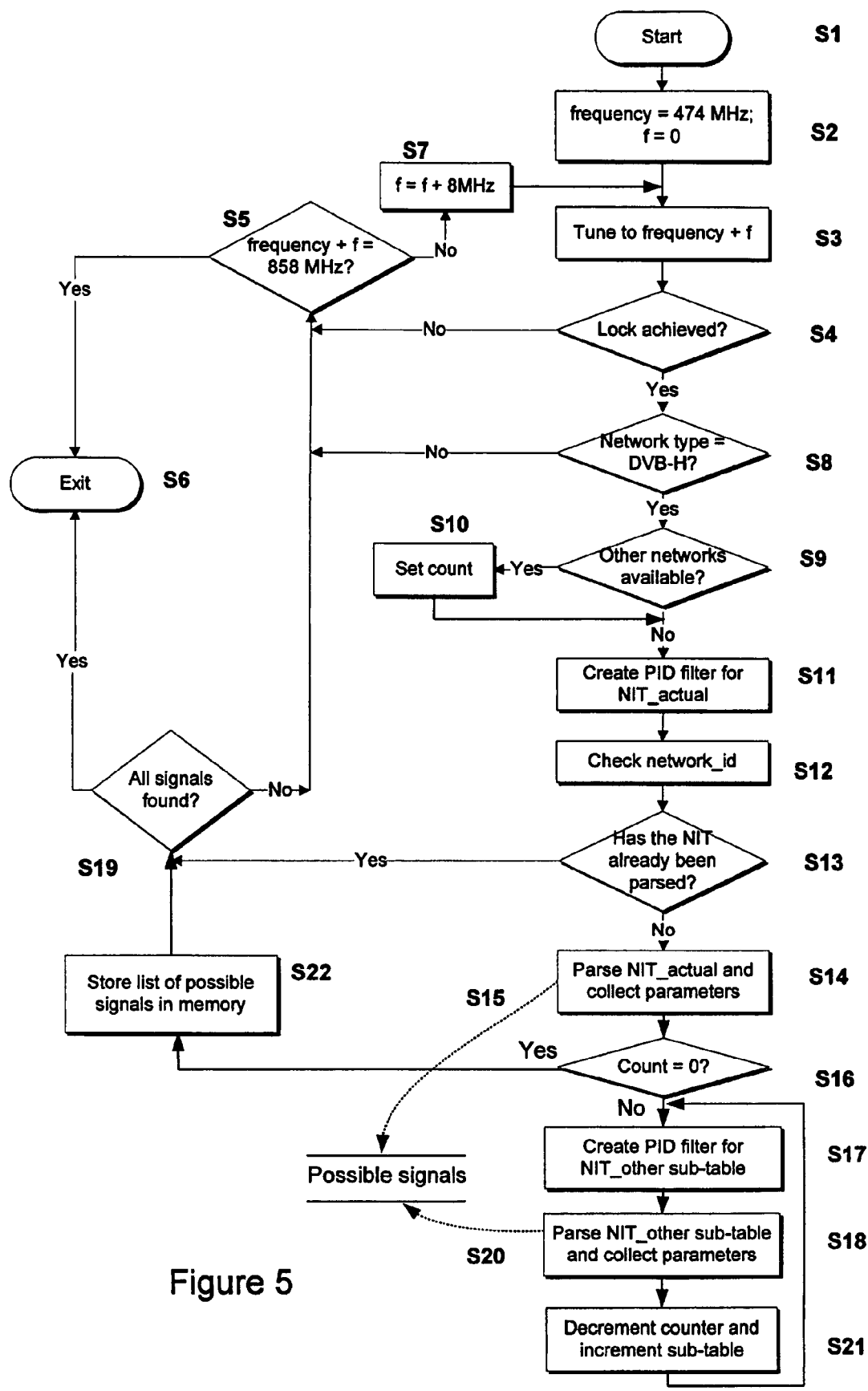
FIG. 5 is a flowchart illustrating operation of the integrated receiver/decoder of FIG. 3 in a signal scan procedure when broadcast data is according to a second embodiment of the invention.

Referring to FIG. 5, the procedure is started at step S1. At step S2 a variable "frequency" is set to the lowest frequency of the frequency band, which in this example is 474 MHz, and a variable "f" is set to a value of 0. At step S3 the receiver 22 is tuned to a frequency equal to "frequency" plus "f". At step S4, it is determined by the CPU 20 whether or not tuning lock is achieved. The absence of a tuning lock is used to infer that no signal of sufficient strength is being transmitted at that frequency. Accordingly, a negative determination to step S4 leads to step S5 where it is determined if the sum of the variables "frequency" and "f" is equal to 858 MHz, which is the highest frequency of the frequency band in this example. If a positive determination is made, it is inferred that the entire frequency band has been searched and the procedure proceeds to exit at step S6. Otherwise, the procedure advances to step S7, where the variable "f" is increased by 8 MHz and the procedure returns again to step S3. 8 MHz is the bandwidth used in Finland and other European countries, although DVB also allows bandwidths of 6 or 7 MHz and a bandwidth of 5 MHz has also been proposed. The bandwidth may be derived from the terrestrial_delivery_system_descriptor of a first-decoded NIT, and used by the receiver to set a bandwidth parameter therein. It will be appreciated that the bandwidth must be known before the receiver 6 can lock to a signal.

When at step S4 tuning lock is achieved, the operation proceeds to step S8, where the TPS data is examined by the CPU 20. If the examination of the TPS data reveals that the network is a DVB-H network, the procedure proceeds to step S9. Otherwise, it is inferred that the signal does not emanate from a suitable network type (i.e. DVB-H) and the procedure retreats to step S5. Whether the network is a DVB-H network can be determined instead from the NIT for the signal, and in particular from the terrestrial_delivery_system_descriptor thereof. At step S9, the CPU 20 determines from the decoded TPS data shown in Table 4, or in a variant thereof, whether or not there are other available networks, using the number of other networks signalled. If this reveals that there are other available networks, a count equal to the number of available networks is set at step S10. Alternatively, the count can be implemented by increment. The main requirement is that it can be determined from the count when all of the available network signals have been found. The number of signals for the count is determined from the decoded TPS data shown in Table 4 or variant thereof. After step S10, or if at step S9 the TPS data indicates no other available networks, the procedure advances to step S11.

At step S11, the PSI/SI data for the prevailing network signal is decoded, if not already decoded, and the NIT is examined. This examination involves the creation of a PID (Packet IDentifier) filter (PID=0x0010) for the TS packets carrying NIT information, having table_id 0x40. These sections of the NIT table are filtered for processing, and network_id and other relevant parameters are extracted therefrom and stored to memory. Tuning parameters for each DVB-H signal are derived from the terrestrial_delivery_descriptor. The cell_id is derived from the cell_frequency_link_descriptor. Also, linkage information for INT table (PMT_service_id for INT) is derived for each signal from the linkage_descriptor. Finally, time_slicing_indicator for each transport_stream is derived from terrestrial_delivery system descriptor. The data relating to broadcast frequency are found in the cell_frequency_link, terrestrial delivery system, and frequency_list descriptors of the NIT At step S12, the information in the network_id field for the prevailing network is examined. At step S13 it is determined from the network_id field whether the NIT has already been parsed. The NIT will already have been parsed if the NIT was included in any of the previously found signals. If the NIT has already been parsed, the procedure advances to step S19. If the NIT has not already been parsed, at step S14 the NIT is parsed by the CPU 20 and the parameters needed for OSI layers 1 and 2 service discovery are collected therefrom. Also, the next 'network_information_section—other_network' is processed. The relevant data is stored in an area of temporary memory, indicated at "possible signals", at step S15. The procedure then moves onto step S16, where it is determined whether the count, which was set at step S10 but which may have been decremented, is zero. If it is not zero, a PID filter is created for TS packets carrying information on NIT relating to other networks at step S17. The sections relating to other networks have table_id of 0x41. Such sections having the same network_id form a NIT_other sub_table. The NIT_other sub-table is then parsed at step S18, and transmission parameter information, including parameters needed for OSI layers 1 and 2 service discovery, are collected from it. The network transmission parameters for the other network signal are stored in the area of temporary memory indicated at "possible signals" and used by step S15, at step S20. These are termed 'possible signals' since they are not necessarily known to be receivable by the receiver 6. The network_id for the parsed sub-table is checked also at step S18. At step S21 the counter is decremented, and the counter for sub_table is incremented. The next time step S17 is carried out for that NIT_other table, the already-parsed sub-tables are masked, to filter them out.

When step S16 responds with a 'yes' reply, since the transmission parameters for all the other available networks have been parsed at steps S14 and S18, these parameters are stored in the flash memory 27 at step S22. Following step S22, at step S19, it is determined if all the existing signals, as identified in the TPS data illustrated in Table 4 or variant thereof, have been found. If so, signal scan is terminated at step S6. Otherwise, signal scan is continued at step S5.

Optionally, the version number of the NIT table may be checked on each filtering so that obsolete NIT tables are not used. This would occur at steps S14 and step S18 in FIG. 5. If the version number is the same, then it can be assumed that the NIT table is valid. If the version numbers are different, then it can be assumed that the NIT table is not necessarily valid, and the table with the latest version number is given priority. Both NIT_actual and NIT_other table types have version numbers.

If the TPS data identifies that no other networks are available, then the procedure can be terminated following parsing of the transmission parameters from the single network, without needing to scan for other networks, thereby saving time and power consumption.

As will be appreciated, the procedure illustrated in FIG. 5 can allow for the identification of parameters relating to other networks, thus allowing those networks to be tuned to, without the receiving and decoding of the NIT from the PSI/SI data for the other networks. Also, if there are no other networks, this is known from examination of the TPS bits of the prevailing network, avoiding the need to scan the other possible frequencies at which signals may be found. In this case, signal scanning can be avoided even if NIT_other is not supported by he network. This can allow the creation of a list of possible signals utilising fewer resources and in a shorter period of time than can be achieved using the prior art procedure.

If the number of available other networks is signalled, the scanning can be terminated as soon as the signalled number of other networks are found and in such case it is not necessary to scan the whole frequency band (in this example 474-858 MHz).

When NIT_other is used to carry transmission parameters relating to other networks, the bandwidth of the transmitted signals is increased. However, this is considered by the inventors to be acceptable in view of the advantages that can be experienced by receivers.

In both of the embodiments, the IRD 6 is arranged to cause to be displayed on the display 26, in a GUI, information allowing the user to view whether there are other networks available, and preferably also to view their number. To advantage, the IRD 6 displays information relating to each available network. This information can simply be the network name, or it may also be other information obtained from the NIT or other data. Once service discovery has been performed, the IRD 6 can display as well data relating to one or more services forming part of the networks. The GUI can be controlled by the user to display the information that the user requires to view.

The standards that are referred to in the above embodiments are ETSI EN 300 744 and ETSI EN 300 468. Although the above embodiments have been described in relation to the DVB broadcast system, it will be appreciated that that the principles can be transferred to other broadcast systems or to multicast or unicast systems. Such a system may be DVB-T, DVB-H, or the Advanced Television System (ATSC) or the Japanese Integrated Services Digital Broadcasting (ISDB, or ISDB-T) system, to list some non-limiting examples.

II. Handover Between Cells

In accordance with aspects of the invention, cells are modeled with bitmaps that provide real-life free field two or three dimensional plane models of the signal levels existing in a well-defined adjustable area and resolution. This is in contrast to conventional methods that use bulky rectangular representations of coverage areas of cell.

The aspects of the invention described herein are particularly well suited for use with DVB type cells. For example, embodiments introduce a signaling method, which can be used to improve mobility in DVB-T/H networks i.e. determination and signaling of the coverage area of cell (size of cell and location of cell). Currently the signaling geographical location of cell is roughly defined in DVB PSI/SI specifications. Aspects of the invention provide a signaling method, which improves accuracy for this.

Bitmap information may be created based on the measurements within the area of each cell. The signal strength values may be received from one or more terminals or testing devices. The received values may then be processed e.g. statistically and compared to values provided by other means such as from dedicated measurement devices, which may be mobile or fixed. The bitmap is not restricted to using elementary cells, which are square-shaped. The cells may take a variety of different forms, such as triangle, preferably equilateral, or a hexagon, which may be composed of six equilateral triangles. One or more bitmaps may also be in a form of concentric circles or circular zones, wherein each of the 'belts' may be divided into segments.

Two or more neighboring cells may be combined to one cell for which the signal strength is announced. In these cases, the addressing of the cells may be adapted to suit the selected elementary cell shape. Also a 'reference point' of the bitmap expressed in the exemplary embodiment with latitude and longitude coordinates may be chosen otherwise e.g. as a center point of the cell or as the location of the transmitting antenna.

Figure 6:
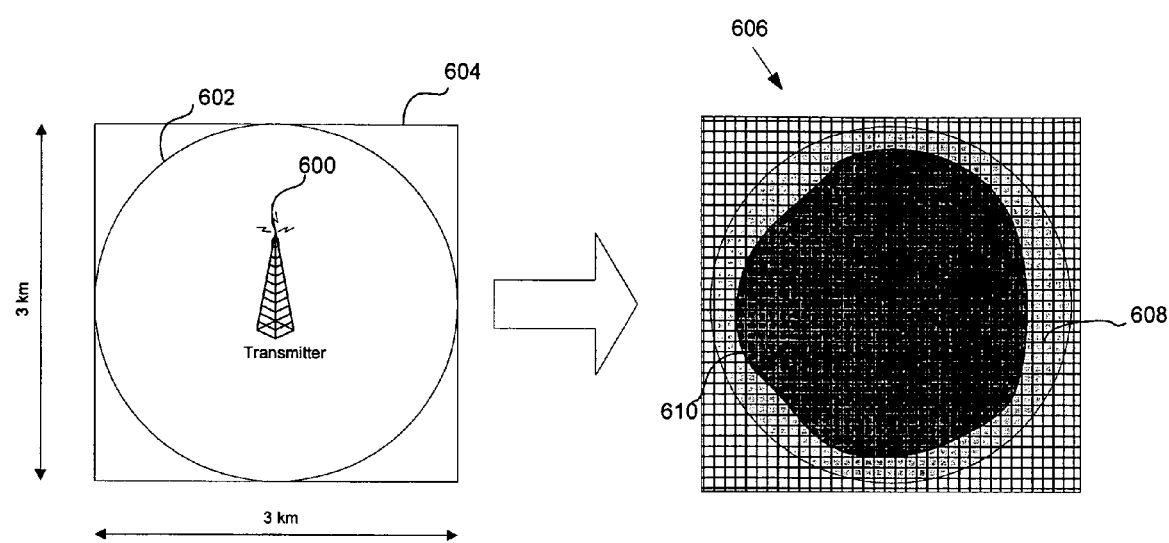
FIG. 6 illustrates the mapping of signal coverage area into a bitmap, in accordance with an embodiment of the invention.

FIG. 6 illustrates the mapping of signal coverage area into a bitmap, in accordance with an embodiment of the invention. A transmission tower 600 transmits a signal within a coverage area defined by circle 602, which fits within square area 604. A bitmap 606 includes a grid that represents signal strengths. For example, an area 608 represents points that have a first signal strength and are represented by a first shade and an area 610 represents points that have a second signal strength and are represented by a second shade. Of course, the granularity of bitmap 606 may be increased to represent numerous additional levels of signal strength.

Figure 7:
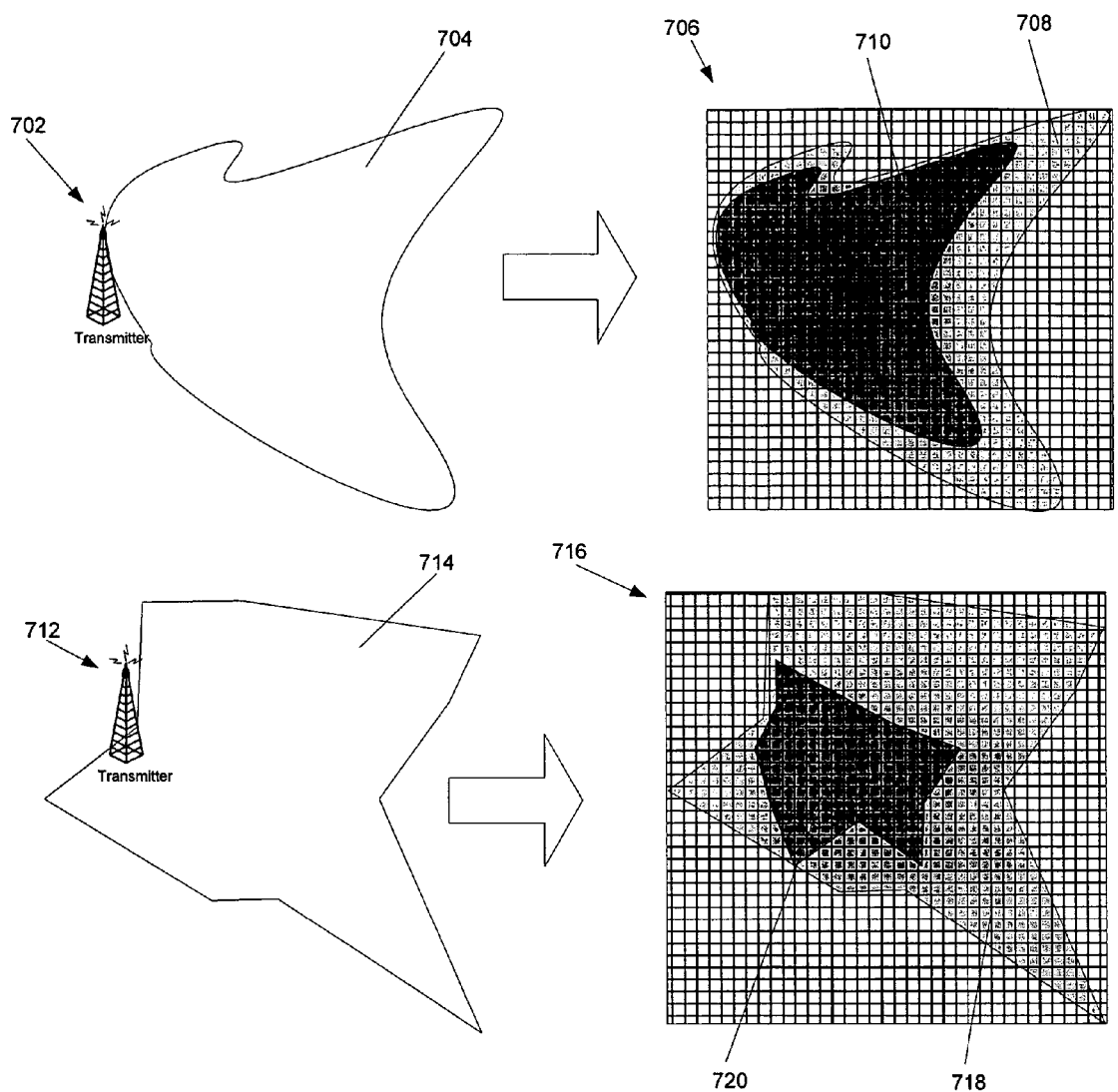
FIG. 7 illustrates the mapping of a non-uniform signal coverage area into a bitmap, in accordance with an embodiment of the invention.

Bitmaps may also represent non-uniform field patterns. FIG. 7 illustrates the mapping of a non-uniform signal coverage area into a bitmap, in accordance with an embodiment of the invention. Transmitter 702 produces a field pattern 704 that results in a bitmap 706 having signal strength levels 708 and 710. Transmitter 712 produces a field pattern 714 that results in a bitmap 716 having signal strength levels 718 and 720.

Bitmap information may be provided as an input to any signalling item (such as a cell descriptor table), which provides bitmap information to mobile terminals. In some embodiments of the invention bitmaps may be available in more than one version. The version may have different degrees of detail and differ from each other e.g. with regard to elementary cell size and/or depth. The different versions may be signaled to a mobile terminal so that the terminal may select which of the versions it receives and stores. In one embodiment of the invention, the order of the versions may be such that the first map(s) are not as detailed as the later ones with regard to the elementary cells size and/or depth. The bitmap, parts of it, its IP address or its availability may be sent to a mobile terminal in some embodiments of the invention by using SMS or MMS as some terminals may have the functionality of a mobile phone and a DVB receiver. The same information may be sent over other communications networks.

Figure 8:
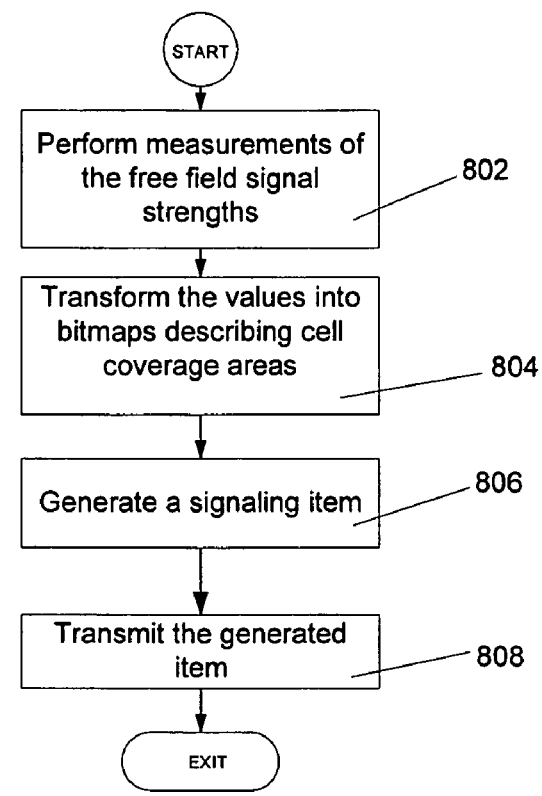
FIG. 8 illustrates an exemplary method for generating bitmaps, in accordance with an embodiment of the invention.

FIG. 8 illustrates an exemplary method for generating bitmaps, in accordance with an embodiment of the invention. First, in step 802 measurements of the free field signal strengths of one or more cells is performed. Step 802 may be performed by using a testing device to measure actual signal strengths within a cell. Step 802 may be performed periodically or when a cell is modified in a manner that may impact the signal strengths. In an alternative embodiment, a model of a cell may be used to estimate free field signal strengths within a cell. In step 804, the measured or estimated values are transformed into bitmaps describing cell coverage areas. One skilled in the art will appreciate that there are numerous methods that may be used to transform one or more lists of single strength values into a bitmap. A detailed example is provided below. Next, a signaling item is generated in step 806. In exemplary embodiments the signaling item is in the form of a cell descriptor table or OSI layer 3-7 item. Finally, in step 808 the generated item is transmitted to a mobile terminal.

Figure 9:
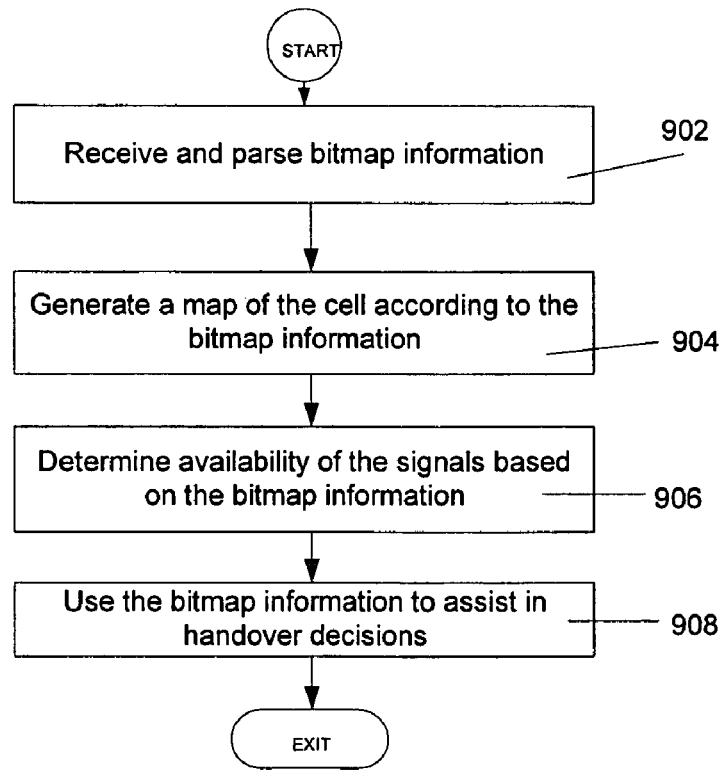
FIG. 9 illustrates an exemplary method for parsing and utilizing a signaling item containing bitmap information in accordance with an embodiment of the invention.

FIG. 9 illustrates an exemplary method for parsing and utilizing a signaling item containing bitmap information in accordance with an embodiment of the invention. First, in step 902 the signaling information is received and parsed. The signaling item may be in the form of a DVB-H/T signal that includes a cell descriptor table that will be parsed. Next, a map of the cell may be generated according to the bitmap information in step 904. The availability of signals based on the bitmap information is determined in step 906. Step 906 may include determining which cells have a predetermined signal strength over a predetermined geographic area. Finally, bitmap information is used to assist in handover decisions in step 908. The process shown in FIG. 9 may be stored in the form of computer-executable instructions stored on a computer-readable media. A CPU within a mobile terminal may be configured to execute the computer-executable instructions.

Figure 10:
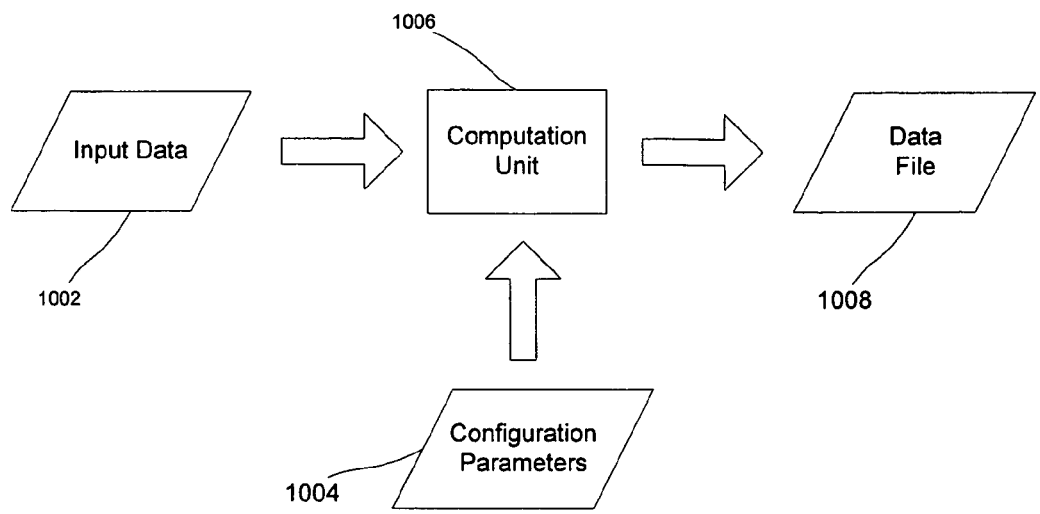
FIG. 10 illustrates a system for creating a data file that contains bitmap information, in accordance with an embodiment of the invention.

FIG. 10 illustrates a system for creating a data file that contains bitmap information, in accordance with an embodiment of the invention. Input data 1002 and configuration parameters 1004 are provided to a computing unit 1006. Input data may include measured and/or estimated signal strengths. Configuration parameters 1004 may include resolution, size, scale, etc. Computation unit 1006 may be implemented with a computer device that is programmed to process input data 1002 and configuration parameters 1004 to create a data file 1008.

Figure 11:
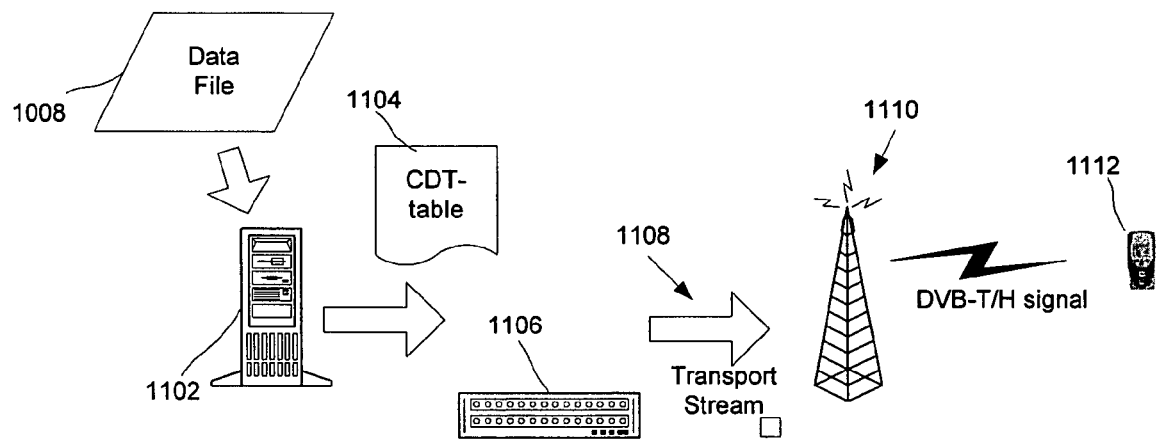
FIG. 11 illustrates a system for receiving a data file, creating a CDT-table and broadcasting the CDT-table to mobile terminals, in accordance with an embodiment of the invention.

FIG. 11 illustrates a system for receiving a data file, creating a CDT-table and broadcasting the CDT-table to mobile terminals, in accordance with an embodiment of the invention. Data file 1008 may be stored on a server 1102 and server 1102 processes data file 1008 to produce a cell descriptor table 1104. Of course, one or more additional or alternative devices may be used to store and process data file 1008 and create cell descriptor table 1104. A multiplexer 1106 inserts cell descriptor table 1104 into a transport stream 1108. A transmission station 1110 may then transmit the transport stream to a mobile terminal 1112.

In alternative embodiments, a bitmap can be transferred to a mobile terminal by other means. For example FileCast, or download using some other bi-directional network interface.

An exemplary structure and semantics of cell descriptor table (CDT-Table) is shown below in Table 5.

TABLE 5

| Table 5: Cell description section Syntax | No. of bits | Identifier |
|---|---|---|
| cell_description_section( ) { | | |
|   table_id | 8 | uimsbf |
|   section_syntax_indicator | 1 | bslbf |
|   reserved_future_use | 1 | bslbf |
|   Reserved | 2 | bslbf |
|   section_length | 12 | uimsbf |
|   cell_id | 16 | uimsbf |
|   Reserved | 2 | bslbf |
|   version_number | 5 | uimsbf |
|   current_next_indicator | 1 | bslbf |
|   section_number | 8 | uimsbf |
|   last_section_number | 8 | uimsbf |
|   network_id | 16 | uimsbf |
|   if (section_number == 0){ | | |
|     Width | 8 | uimsbf |
|     Height | 8 | uimsbf |
|     Scale | 8 | uimsbf |
|     lo_bound | 8 | uimsbf |
|     hi_bound | 8 | uimsbf |
|     Depth | 3 | uimsbf |
|     Compression | 2 | bslbf |
|     Reserved_future_use | 2 | bslbf |
|     Latitude | 25 | uimsbf |
|     Longitude | 26 | uimsbf |
|     Reserved_future_use | 2 | bslbf |
|     data_length | 12 | uimsbf |
|     for(i=0;i<N;i++){ | | |
|       Byte | 8 | uimsbf |
|     } | | |
|   } | | |
|   for(i=0;i<N;i++){ | | |
|     cell_id_extension | 8 | uimsbf |
|     subcell_width | 8 | uimsbf |
|     subcell_height | 8 | uimsbf |
|     subcell_scale | 8 | uimsbf |
|     subcell_lo_bound | 8 | uimsbf |
|     subcell_hi_bound | 8 | uimsbf |
|     subcell_depth | 3 | uimsbf |
|     subcell_compression | 2 | bslbf |

TABLE 5-continued

| Table 5: Cell description section Syntax | No. of bits | Identifier |
|---|---|---|
|     Reserved_future_use | 2 | bslbf |
|     subcell_latitude | 25 | uimsbf |
|     subcell_longitude | 26 | uimsbf |
|     Reserved_future_use | 2 | bslbf |
|     subcell_data_length | 12 | uimsbf |
|     for(i=0;I<N;i++){ | | |
|       subcell_byte | 8 | uimsbf |
|     } | | |
|   } | | |
|   CRC_32 | 32 | rpchof |

Semantics for the cell description section:

table_id: identifier of the table.

section_syntax_indicator: The section_syntax_indicator is a 1-bit field which shall be set to "1".

section_length: This is a 12-bit field, the first two bits of which shall be "00". It specifies the number of bytes of the section, starting immediately following the section_length field and including the CRC. The section_length shall not exceed 4093 so that the entire section has a maximum length of 4096 bytes.

cell_id: This is a 16-bit field which uniquely identifies a cell.

version_number: This 5-bit field is the version number of the sub-table. The version_number shall be incremented by 1 when a change in the information carried within the sub_table occurs. When it reaches value 31, it wraps around to 0. When the current_next_indicator is set to '1', then the version_number shall be that of the currently applicable sub_table defined by the table_id, platform_id and action_type. When the current_next_indicator is set to '0', then the version_number shall be that of the next applicable sub_table defined by the table_id, platform_id and action_type.

current_next_indicator: This 1-bit indicator, when set to '1' indicates that the sub_table is the currently applicable sub_table. When the bit is set to '0', it indicates that the sub_table sent is not yet applicable and shall be the next sub_table to be valid.

section_number: This 8-bit field gives the number of the section. The section_number of the first section in the sub_table shall be "0x00". The section_number shall be incremented by 1 with each additional section with the same table_id, platform_id and action_type.

last_section_number: This 8-bit field indicates the number of the last section (that is, the section with the highest section_number) of the sub_table of which this section is part.

network_id: This is a 16-bit field that identifies the network that the described cell is part of.

width: This 8-bit field specifies the width of the bitmap in pixels.

height: This 8-bit field specifies the height of the bitmap in pixels.

scale: This 7-bit field tells the geographical size of one bitmap pixel. The size is scale*10 m, so that e.g. 42 would specify that each pixel represents a geographical area of 420 m*420 m.

lo_bound: This 7-bit field is the low bound of field strength. It is the absolute value of the dBm value represented by pixel value 1. If bit depth is 1, this shall be the same as hi_bound.

hi_bound: This 7-bit field is the high bound of field strength. It is the absolute value f of the dBm value represented by the highest possible pixel value. If bit depth is 1, this shall be the same as lo_bound.

latitude: This 25-bit field tells the geographical position of the lower-left (south-west) corner of the bitmap. This field shall be set to the two's complement value of the latitude, referenced to the WGS-84 reference ellipsoid, in units of $180/2^{25}$ degrees, in the range from −90 degrees to $+90\times(1-2^{-24})$ degrees, counting positive angles north of the equator and negative angles south of the equator.

longitude: This 26-bit field tells the geographical position of the lower-left (south-west) corner of the bitmap. This field shall be set to the two's complement value of the longitude, referenced to the WGS-84 reference ellipsoid, in units of $360/2^{26}$ degrees, in the range from −180 degrees to $+180\times(1-2^{-25})$ degrees, counting positive angles east of the Greenwich meridian and negative angles west of the Greenwich meridian depth: This 3-bit field is the bit depth of the bitmap. The bit depth tells how many bits are used to specify each pixel, i.e. bit depth of 4 would indicate that the bitmap has $2^4=16$ levels. It shall not be 0.

compression: This 2-bit field tells the compression method used to compress the bitmap data. Exemplary compression values are described in Table 6.

TABLE 6

Signalling compression method

| Compression | Compression method |
|---|---|
| 00 | Uncompressed |
| 01 | Reserved for future use |
| 10 | Reserved for future use |
| 11 | Reserved for future use | data_length: This 12-bit field specifies the length in bytes of the following bitmap data.

byte: This is an 8-bit field. An array of byte fields specify the bit string of bitmap data compressed using the method specified in compression field. If necessary, the bit string is padded with '0'-bits to meet next 8-bit boundary at the end of data.

cell_id_extension: This 8-bit field is used to identify a subcell within a cell.

subcell_width: see width.
subcell_height: see height.
subcell_scale: see scale.
subcell_lo_bound: see lo_bound.
subcell_hi_bound: see hi_bound.
subcell_latitude: see latitude.
subcell_longitude: see longitude.
subcell_depth: see depth.
subcell_compression: see compression.
subcell_data_length: see data_length.
subcell_byte: see byte.

CRC__32: This is a 32-bit field that contains the CRC value that gives a zero output of the registers in the decoder defined in EN 300 468 after processing the entire private section.

In alternative embodiments, other means to deliver the data file to a terminal may be used, e.g. OSI layer 3-7 signalling can be used as well. (Bitmaps could be provided e.g. as separate service or within part of ESG or similar).

Figure 12:
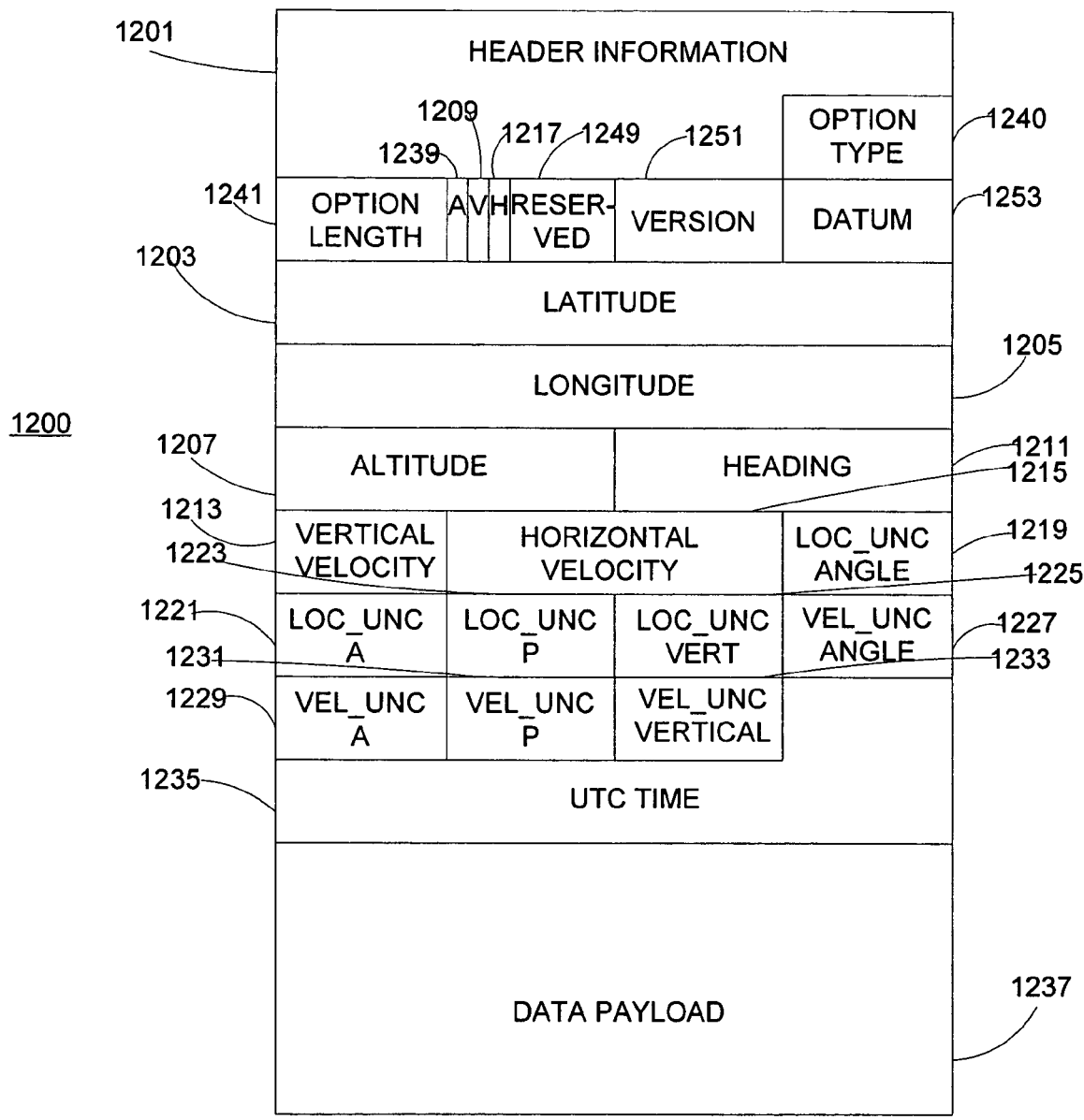
FIG. 12 illustrates an exemplary data structure for expressing vector information, in accordance with an embodiment of the invention.
Figure 13:
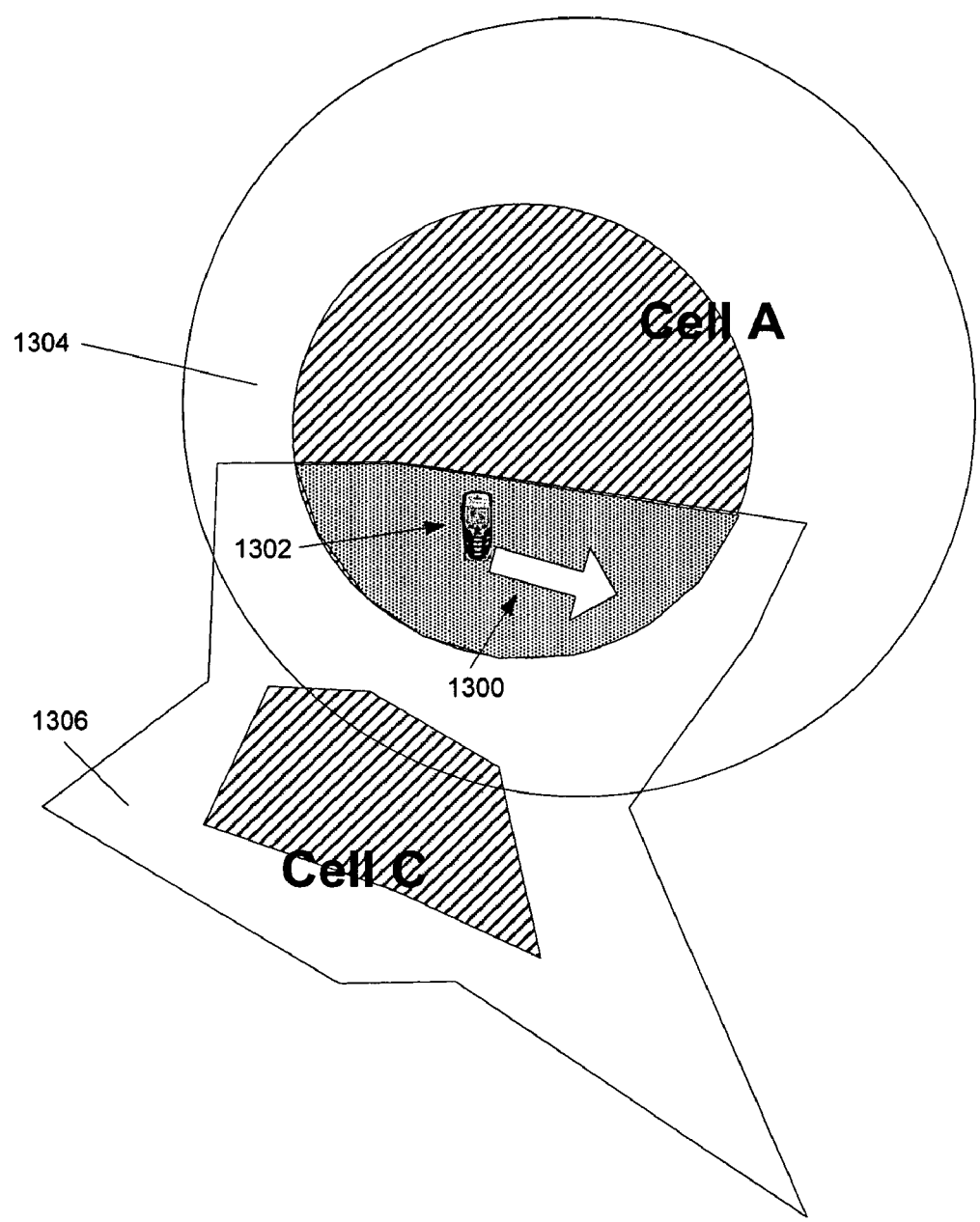
FIG. 13 illustrates a vector that represents movement of a mobile terminal relative to two cells, in accordance with an embodiment of the invention.

FIG. 12 illustrates an exemplary data structure for expressing vector information, in accordance with an embodiment of the invention. An exemplary vector 1300 representing movement of a mobile terminal 1302 relative to a cell 1304 and a cell 1306 is shown in FIG. 13. Datagram 1200 comprises header information 1201 (such as the source IP address and the destination address) and data payload 1237. Also, datagram 1200 comprises geographical position information about a source device corresponding to a option type data field 1240, an option length data field 1241, a reserved data field 1249, a version data field 1251, a datum data field 1253, a latitude data field 1203, a longitude data field 1205, altitude data fields 1207 and 1239, velocity data fields 1209, 1211, 1213, and 1215, location uncertainty data fields 1217, 1219, 1221, 1223, and 1225, velocity uncertainty data fields 1227, 1229, 1231, and 1233, and time data field 1235. Time data field 1235 is a 40-bit field that contains the current time and data in Coordinated Universal Time (UTC) and Modified Julian Date (MJD). Field 1235 is coded as 16 bits providing 16 LSBs of the MJD followed by 24 bits that represent 6 digits in a 4-bit Binary-Coded Decimal (BCD). In the exemplary embodiment, the geographical information is contained in a destination options header or in a hop-by-hop header, in compliance with RFC 2460. In the embodiment, a destination options header and a hop-by-hop header may be contained in the same datagram.

Referring to FIG. 12, the full width may correspond to 32 bits (4 octets). However, other embodiments of the invention may utilize different data field alignments and different data widths for any of the data fields. In the exemplary embodiment, the data fields may be contained in a header that is compatible with RFC 2460.

In the exemplary embodiment, version data field 1251 is an 8-bit field that indicates the version of the message header. Datum data field 1253 is an 8-bit field that indicates the used map datum (e.g., standard MIL-STD-2401) for determining the geographical position. Latitude data field 1203 is a 32-bit field that indicates the latitude value of the source device (e.g., corresponding to an approximate location of terminal node 107) presented in ANSI/IEEE Std 754-1985 format. Longitude data field 1205 is a 32-bit field that indicates the longitude value of the source device presented in ANSI/IEEE Std 754-1985 format. Alt indicator data field 1239 is a 1-bit field indicating the use of altitude information. Altitude data field 1207 is a 16-bit field that indicates the altitude value of the source device presented in ANSI/IEEE Std 754-1985 format.

Velocity indicator data field 1209 is a 1-bit field indicating the use of velocity information. If velocity information is included, this field is set to '1'. Otherwise this field is set to '0'. Heading data field 1211 is a 16-bit field that indicates the direction where the mobile node is moving. If velocity indicator data field 1209 is set to '0', this field is ignored. Otherwise, this field is included and is set to the angle of axis of horizontal velocity uncertainty, in units of 5.625 degrees, in the range from 0 to 84,375 degrees, where 0 degrees is True North and the angle increases toward the East. Vertical velocity data field 1213 is an 8-bit field, which indicates the vertical velocity of the mobile node. Vertical velocity data field 1213 is used if field 1209 is set to '1'. Horizontal velocity data field 1215 is a 16-bit field that indicates the horizontal velocity of the mobile node. If velocity indicator is set to '1', this field is in use. Once used, the horizontal speed is set in units of 0.25 m/s, in the range from 0 to 511.75 m/s. Otherwise this field is ignored.

Loc_Unc_H indicator data field 1217 is a 1-bit field which indicates the horizontal position uncertainty, including elliptical. If elliptical horizontal position uncertainty information is included in this response element, this field is set to '1'. Otherwise, this field is set to '0'. Loc_Unc angle data field 1219 (angle of axis of the standard error ellipse for horizontal position uncertainty) is an 8-bit field indicating the angle of axis of the standard error ellipse for horizontal position uncertainty. If Loc_Unc_H indicator field 1217 is set to '0', this field is ignored. Otherwise, this field is included and is set to angle of axis for horizontal position uncertainty, in units of 5.625 degrees, in the range from 0 to 84.375 degrees, where 0 degrees is True North and the angle increases toward the East. Loc_Unc A data field 1221 (standard deviation of error along angle specified for horizontal position uncertainty) is an 8-bit field indicating the standard deviation of error along angle specified for horizontal position uncertainty. If Loc_Unc A data field 1221 is set to '0', this field is ignored. Otherwise, this field is included and is set to represent the standard deviation of the horizontal position error along the axis corresponding to Loc_Unc angle data field 1219. Loc_Unc P data field 1223 (standard deviation of error along angle specified for horizontal position uncertainty) is a 8-bit field indicating standard deviation of error along angle specified for horizontal position uncertainty. If Loc_Unc P data field 1223 is set to '0', this field is ignored. Otherwise, this field is included and is set to represent the standard deviation of the horizontal position error perpendicular to the axis corresponding to Loc_Unc angle data field 1219. Loc_Unc vertical data field 1225 (standard deviation of vertical error for position uncertainty) is an 8-bit field indicating standard deviation of vertical error for position uncertainty.

Vel_Unc angle data field 1227 (angle of axis of standard error ellipse for horizontal velocity uncertainty) is an 8-bit field indicating the angle of axis of standard error ellipse for horizontal velocity uncertainty. If Vel_Unc angle data field 1227 is set to '0', this field is ignored. Otherwise, this field is set to the angle of axis for horizontal velocity uncertainty, in units of 5.625 degrees, in the range from 0 to 84,375 degrees, where 0 degrees is True North and the angle increases toward the East. Vel_Unc A data field 1229 (standard deviation of error along angle specified for horizontal velocity uncertainty) is an 8-bit field indicating standard deviation of error along angle specified for horizontal velocity uncertainty. If velocity indicator data field 1209 is set to '1', this field is included and is set to represent the standard deviation of the horizontal velocity error along the angle corresponding to Vel_Unc angle data field 1227. Vel_Unc P data field 1231 (standard deviation of error perpendicular to angle specified for horizontal velocity uncertainty) is a 8-bit field indicating standard deviation of error perpendicular to angle specified for horizontal velocity uncertainty. If velocity indicator data field 1209 is set to '1', this field is included and is set to represent the standard deviation of the horizontal velocity error perpendicular to the angle corresponding to Vel_Unc angle data field 1227. Otherwise, this field is ignored. Vel_Unc vertical data field 1233 (standard deviation of vertical velocity error) is an 8-bit field indicating the standard deviation of vertical velocity error.

In the embodiment shown in FIG. 12, location uncertainty data fields 1219-1225 may be used to define a geographical area, where the data of location uncertainty data fields may not be as specified by standards, but can be used by an application for conveying region information. In such a case, the application could recognize the use of location uncertainty data fields 1219-1225 and/or the variation from the specification as indicated in some other field of the header.

Figure 14:
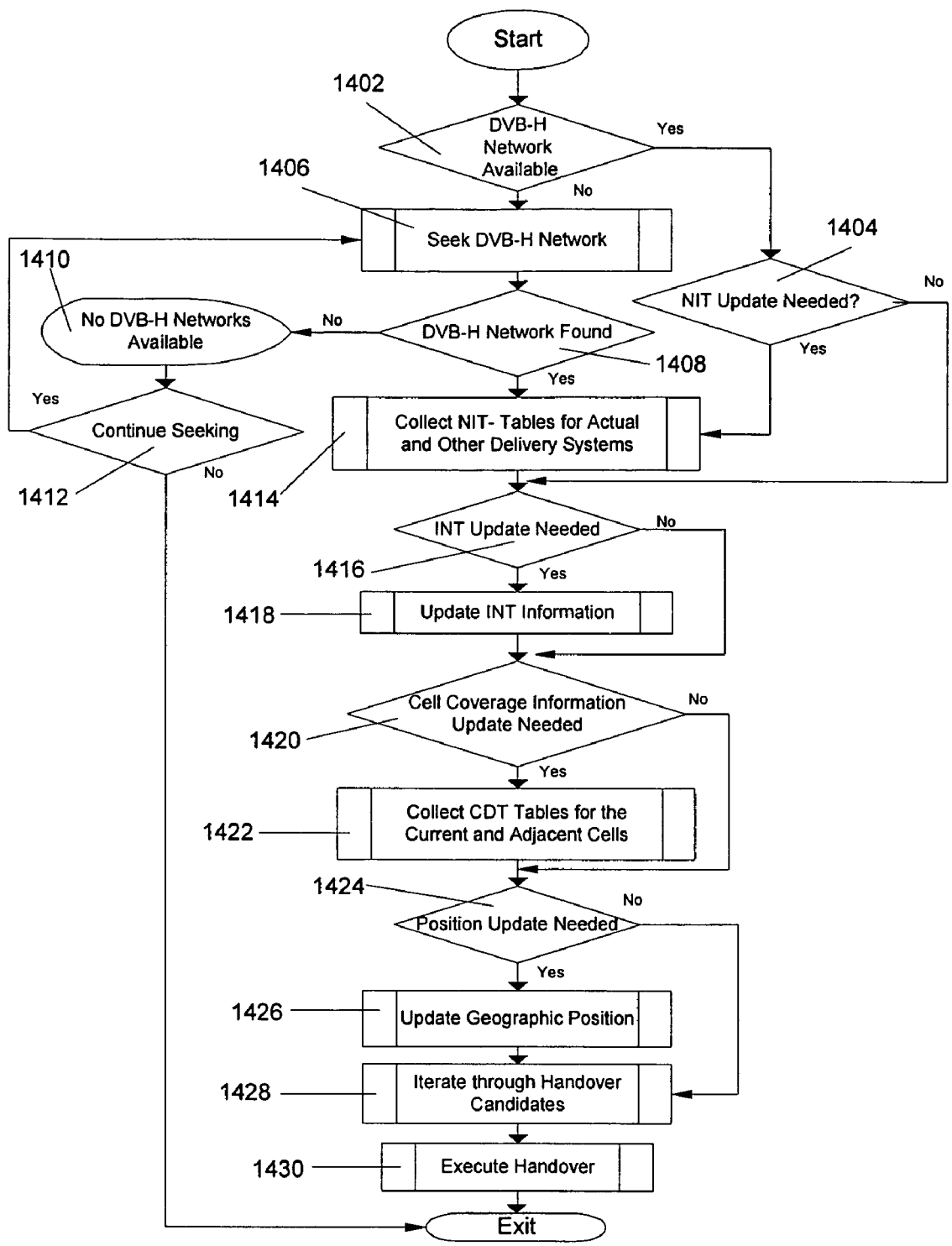
FIG. 14 illustrates an exemplary method for executing a handover decision between networks and cells, in accordance with an embodiment of the invention.

One skilled in the art will appreciate that the network handover and cell handover aspects of the invention may be combined and used together. For example, FIG. 14 illustrates an exemplary method for executing a handover decision between networks and cells, in accordance with an embodiment of the invention.

In step 1402 it is determined whether or not a DVB-H network is available. When a network is available, in step 1404 it is determined whether or not an NIT update is needed. When an NIT update is needed, in step 1414 NIT tables are collected for actual delivery systems and other delivery systems. The delivery systems in step 1414 may be DVB-H networks. When it is determined that a DVB-H network is not available in step 1402, in step 1406 a mobile terminal seeks DVB-H networks. Conventional network seeking methods may be used in step 1406.

In step 1408 it is determined whether or not a DVB-H network has been found. When such a network has been found, control passes to step 1414. When a DVB-H network has been found, an indication may be displayed to a user of a mobile terminal in step 1410. For example, an indication indicating that no DVB-H networks are available may be displayed. Next, a user may determine whether or not the user wishes for the mobile terminal to continue seeking DVB-H networks in step 1412. When the user decides not to continue seeking DVB-H networks, the process ends. When the user desires for the mobile terminal to continue seeking DVB-H networks, control returns to step 1406.

After step 1414 or when an NIT update is not needed, it is next determined whether or not an INT update is needed in step 1416. When such an update is needed, an INT information update operation is performed in step 1418. After step 1418 or when an INT update is not needed, it is next determined whether a cell coverage information update is needed in step 1420. When such an update is needed, an operation for collecting cell descriptor tables for the current and adjacent cells is performed in step 1422.

After step 1422 or when no cell coverage information update is needed, it is next determined whether or not position update information is needed in step 1424. When such an update is needed, an operation is performed for updating the geographic position of the mobile terminal in step 1426. Step 1426 may include using a global positioning system module or any other conventional method for determining the position of a mobile terminal. After step 1426 or when position update information is not needed, a mobile terminal then iterates through handover candidates in step 1428. One skilled in the art will appreciate that numerous methods may be used to select the best handover candidate with the information that has been obtained by executing the process shown in FIG. 14. After handover candidates have been examined, in step 1430 the mobile terminal executes a handover operation between networks and/or cells.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A method comprising:
   receiving a signal digitally broadcast from a transmitter of a prevailing network, the signal including transmission parameter information bits;
   decoding the transmission parameter information bits from the received signal; and
   determining from the decoded transmission parameter information whether or not one or more other networks are available.

2. The method as claimed in claim 1, wherein the process of determining comprises determining from the decoded transmission parameter information bits the number of other networks that the digital broadcast includes.

3. The method as claimed in claim 1, wherein the process of decoding comprises decoding a network information table from the signal, and determining from the decoded network information table transmission parameters of one or more of the other networks.

4. The method as claimed in claim 3, further comprising using the transmission parameters to tune a receiver to the one or more other signals.

5. The method as claimed in claim 1, further comprising:
scanning for signals from the one or more other networks,
determining from the decoded transmission parameter information whether any of the other networks remain unfound, and
ceasing scanning when the number of unfound networks is determined to be zero.

6. The method as claimed in claim 1, wherein the process of decoding comprises:
decoding other network descriptor information from the received signal, to identify the number of other networks.

7. The method as claimed in claim 2, further comprising:
scanning for signals from the one or more other networks,
determining from the number of networks whether any of the other networks remain unfound, and
ceasing scanning when the number of unfound networks is determined to be zero.

8. The method as claimed in claim 1, further comprising:
obtaining from the decoded other network descriptor information transmission parameters relating to the one or more other networks.

9. The method as claimed in claim 1, further comprising:
decoding other network descriptor information from the network, to obtain transmission parameters relating to other networks.

10. The method as claimed in claim 9, further comprising using the transmission parameters to tune receiver to one or more other signals.

11. The method as claimed in claim 10, in which the parameters include tuning information.

12. A method comprising:
receiving a signal digitally broadcast from a transmitter of a prevailing network, the signal including other network descriptor information;
decoding the other network descriptor information from the received signal,
obtaining from the other network descriptor information transmission parameters relating to one or more other networks, and
using the transmission parameters to tune a receiver to the one or more other networks.

13. The method as claimed in claim 12, wherein the transmission parameters include tuning information.

14. Apparatus comprising:
a receiver module configured to receive a signal digitally broadcast from a transmitter of a prevailing network, the signal including transmission parameter information bits;
a decoder configured to decode the transmission parameter information from the received signal; and
a determiner configured to determine from the decoded transmission parameter information whether or not other networks are available.

15. Apparatus comprising:
a receiver module configured to receive a signal digitally broadcast from a transmitter of a prevailing network, the signal including other network descriptor information;
a decoder configured to decode the other network descriptor information from the received signal,
a filter configured to obtain from the decoded other network descriptor information transmission parameters relating to one or more other networks, and
a tuner controller configured to use the transmission parameters relating to the one or more other networks to tune the receiver module to the one or more other networks.

16. The apparatus as claimed in claim 15, further including a display configured to display data relating to other networks.

17. A method comprising:
creating transmission parameter information including an indication of whether or not other networks are available within the broadcast; and
forming a signal for digital broadcast, the signal including the transmission parameter information.

18. The method as claimed in claim 17, wherein the process of creating comprises including an indication of the number of other networks that the digital broadcast includes.

19. The method as claimed in claim 18, wherein the process of creating comprises including an indication of the number of other networks that the digital broadcast includes in other network descriptor information.

20. The method as claimed in claim 19, wherein the process of creating comprises including transmission parameters relating to other networks in other network descriptor information.

21. The method as claimed in claim 20, comprising forming the signal by creating a network information table, the network information table including transmission parameters of one or more of the other networks.

22. A method comprising:
creating other network descriptor information for a network of a digital broadcast, and including in the other network descriptor information transmission parameters identifying whether or not other networks are available in the digital broadcast; and
forming a signal for transmission, the signal including the other network description information.

23. The apparatus as claimed in claim 14, wherein the decoder is configured to decode other network descriptor information from the network, to obtain transmission parameters relating to other networks.

24. The apparatus as claimed in claim 23, wherein the transmission parameters are used to tune the receiver module to one or more other signals.

25. The apparatus as claimed in claim 24, wherein the transmission parameters include tuning information.

26. A computer-readable medium including executable instructions, that, when provided to a processor, cause the processor to perform:
receiving a signal digitally broadcast from a transmitter of a prevailing network, the signal including transmission parameter information bits;
decoding the transmission parameter information bits from the received signal; and
determining from the decoded transmission parameter information whether or not one or more other networks are available.

27. The computer-readable medium of claim 26, further including executable instructions for decoding other network descriptor information from the network, to obtain transmission parameters relating to other networks.

28. The computer-readable medium of claim 27, further including executable instructions for using the transmission parameters to tune a receiver to one or more other signals.

29. The computer-readable medium of claim 28, wherein the transmission parameters include tuning information.

* * * * *

UNITED STATES PATENT AND TRADEMARK OFFICE
CERTIFICATE OF CORRECTION

PATENT NO.         : 7,567,806 B2                                    Page 1 of 1
APPLICATION NO.    : 10/935892
DATED              : July 28, 2009
INVENTOR(S)        : Jani Väre et al.

It is certified that error appears in the above-identified patent and that said Letters Patent is hereby corrected as shown below:

In Column 25, Claim 10, Line 33:
        Please delete "tune receiver" and insert --tune a receiver--

Signed and Sealed this

Second Day of February, 2010

David J. Kappos
*Director of the United States Patent and Trademark Office*